US009331338B2

(12) United States Patent
Hwang et al.

(10) Patent No.: US 9,331,338 B2
(45) Date of Patent: May 3, 2016

(54) POLYMER COMPOSITION FOR LITHIUM SECONDARY BATTERY, ELECTRODE FOR LITHIUM SECONDARY BATTERY INCLUDING THE SAME, AND LITHIUM SECONDARY BATTERY INCLUDING THE ELECTRODE

(71) Applicants: SAMSUNG ELECTRONICS CO., LTD., Suwon-si, Gyeonggi-do (KR); SAMSUNG SDI CO., LTD., Yongin-si, Gyeonggi-do (KR)

(72) Inventors: Seung-sik Hwang, Seongnam-si (KR); Jun-hwan Ku, Seoul (KR); Jeong-kuk Shon, Hwaseong-si (KR); Jae-man Choi, Hwaseong-si (KR)

(73) Assignees: SAMSUNG ELECTRONICS CO., LTD. (KR); SAMSUNG SDI CO., LTD. (KR)

(*) Notice: Subject to any disclaimer, the term of this patent is extended or adjusted under 35 U.S.C. 154(b) by 166 days.

(21) Appl. No.: 14/043,939

(22) Filed: Oct. 2, 2013

(65) Prior Publication Data
US 2014/0131630 A1    May 15, 2014

(30) Foreign Application Priority Data

Nov. 14, 2012   (KR) .................. 10-2012-0129097

(51) Int. Cl.
*H01M 4/62* (2006.01)
*H01M 4/13* (2010.01)
(52) U.S. Cl.
CPC ............. *H01M 4/622* (2013.01); *H01M 4/13* (2013.01)
(58) Field of Classification Search
CPC ........................................... H01M 4/622
USPC .................... 252/519.2; 525/327.8
See application file for complete search history.

(56) References Cited

U.S. PATENT DOCUMENTS

| 7,527,858 | B2 | 5/2009 | Lundquist |
| 7,744,772 | B2 | 6/2010 | Gambut-Garel et al. |
| 7,875,388 | B2 | 1/2011 | Le |
| 2005/0244715 | A1* | 11/2005 | Cho ............... H01M 4/0402 429/246 |
| 2011/0311855 | A1 | 12/2011 | Peng et al. |
| 2012/0015236 | A1 | 1/2012 | Spare |
| 2012/0100423 | A1 | 4/2012 | Schubert |
| 2012/0189895 | A1 | 7/2012 | Gutsch et al. |
| 2015/0076414 | A1* | 3/2015 | Hwang ............. H01M 4/622 252/500 |
| 2015/0203722 | A1* | 7/2015 | Yoshida .......... H01M 4/621 429/212 |

FOREIGN PATENT DOCUMENTS

| JP | 5137990 A | 3/1976 |
| JP | 5660441 A | 5/1981 |
| JP | 56060441 A | 5/1981 |
| JP | 2005149881 A | 6/2005 |
| JP | 2006351316 A | 12/2006 |
| JP | 4301923 B2 | 5/2009 |
| JP | 2010116475 A | 5/2010 |
| JP | 4657019 B2 | 1/2011 |
| JP | 2012018909 A | 1/2012 |
| KR | 1020070037686 A | 4/2007 |
| KR | 100857514 B1 | 9/2008 |
| KR | 1020120007508 A | 1/2012 |
| KR | 1020120096461 A | 8/2012 |

OTHER PUBLICATIONS

Athey, Robert, "The Keys to Dispersing Corrosion Inhibitive Pigments for WB Coatings", Journal of Water Borne Coatings, Aug. 1982, 25-32.*
Nicholson, John W., et al., "Thermal Behaviour of Partially Neutralised Ethylene-Maleic Acid Copolymer", British Polymer Journal, 21 (1989), 513-517.*
Nakazawa, Tetsuo, et al., "Organic binder for a rapid molding process involving carbon dioxide hardening", Imono (1998), 60(5), 301-306.*
English translation of Tetsuo Nakazawa et al., "Study on Organic Binder for CO2 Gas Hardening Rapid Mollding Process", IMONO, 60 (5), 1988, 301-306.*

* cited by examiner

*Primary Examiner* — Douglas Mc Ginty
(74) *Attorney, Agent, or Firm* — Cantor Colburn LLP

(57) ABSTRACT

A polymer including a first repeating unit represented by Formula 1, a polymer composition for a lithium battery including the polymer, an electrode for a lithium battery including the polymer composition, and a lithium battery including the electrode:

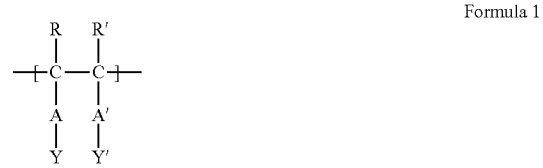

Formula 1 wherein, in Formula 1, R, R', A, A', Y, and Y' are as defined in the specification.

20 Claims, 4 Drawing Sheets

POLYMER COMPOSITION FOR LITHIUM SECONDARY BATTERY, ELECTRODE FOR LITHIUM SECONDARY BATTERY INCLUDING THE SAME, AND LITHIUM SECONDARY BATTERY INCLUDING THE ELECTRODE

CROSS-REFERENCE TO RELATED APPLICATIONS

This application claims priority to and the benefit of Korean Patent Application No. 10-2012-0129097, filed on November 14, and all the benefits accruing therefrom under 35 U.S.C. §119, the content of which are incorporated herein in its entirety by reference.

BACKGROUND

1. Field

The present inventive concept relates to a polymer, an electrode for lithium batteries that includes the polymer, and a lithium battery including the electrode.

2. Description of the Related Art

Lithium batteries have high voltage and high energy density, and thus may be used in various applications. For examples, hybrid electric vehicles ("HEV"), plug-in hybrid electric vehicles ("PHEV"), and the like should be operable at high temperatures, be able to charge or discharge a large amount of electricity, have long-term usability, and thus require lithium batteries having high-discharge capacity and better lifetime characteristics.

To improve capacity and lifetime of a lithium battery, much research has been conducted to develop a novel binder for the lithium battery, in addition to novel positive electrode and negative electrode materials.

Examples of binders in most common use are polyvinylidene fluoride ("PVDF"), styrene butadiene rubber ("SBR"), and sodium carboxymethylcellulose ("Na-CMC").

The smaller the particle size and the larger the specific surface area in negative active materials, the larger a contact area between the negative active material and electrolytic solution becomes, so that side reactions between the electrolytic solution and the negative active material may more likely occur during initial intercalation of lithium ions. This may lead to an increased initial irreversible capacitance, and consequently a low initial efficiency of lithium battery. Thus, there is still a demand for a lithium battery having improved initial efficiency.

SUMMARY

Provided is a novel polymer.

Provided is an electrode for lithium batteries that includes the polymer.

Provided is a lithium battery including the electrode.

Additional aspects will be set forth in part in the description which follows and, in part, will be apparent from the description, or may be learned by practice of the presented embodiments.

According to an aspect of the present inventive concept, a polymer includes a first repeating unit represented by Formula 1 below:

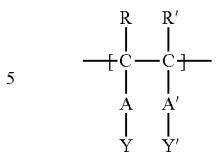

Formula 1 wherein, in Formula 1,

R and R' are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group;

A and A' are each independently —C(C=O)O—, —C(C=O)—, —OS(=O)$_2$O—, —S(=O)$_2$O—, —S(=O)O—, —OP(=O)O$_2$—, or —P(=O)O$_2$—; and Y and Y' are each independently a hydrogen atom, an alkali metal, an ammonium group, or —NH$_2$, provided that Y and Y' are not simultaneously hydrogen atoms or NH$_2$.

According to another aspect of the present inventive concept, there is provided a polymer as a reaction product of (i) an alkali metal- or ammonium group-containing base and (ii) a polymer A including a first repeating unit represented by Formula 4c or Formula 4d below, and a second repeating unit selected from a divalent aliphatic organic group repeating unit and a divalent alicyclic organic group repeating unit:

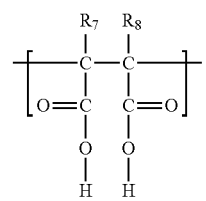

Formula 4c wherein, in Formula 4c,

R$_7$ and R$_8$ are each independently a hydrogen atom or a C1-C10 alkyl group;

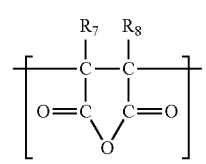

Formula 4d wherein, in Formula 4d,

R$_7$ and R$_8$ are each independently a hydrogen atom or a C1-C10 alkyl group; and a mole fraction of the first repeating unit is from about 0.01 to about 0.99, and a mole fraction of the second repeating unit is from about 0.01 to about 0.99.

According to another aspect of the present inventive concept, an electrode for lithium batteries includes: a polymer including a first repeating unit represented by Formula 1 above; and an electrode active material.

According to another aspect of the present inventive concept, a lithium battery includes the above-described electrode.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
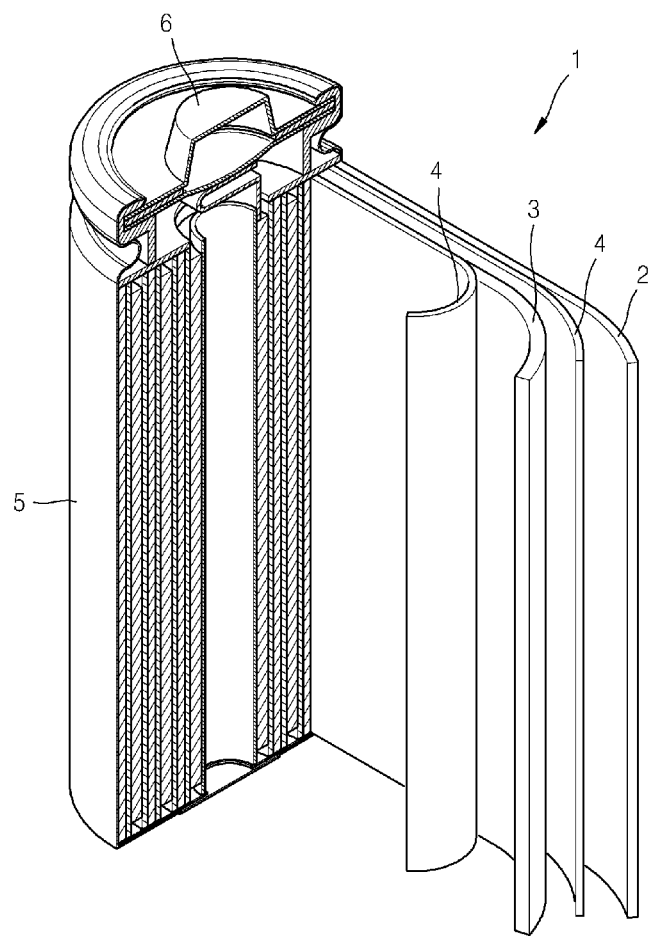
FIG. 1 is an exploded perspective view of a lithium battery according to an embodiment of the present inventive concept.

Reference will now be made in detail to embodiments of a novel polymer, an electrode for lithium batteries, and a lithium battery, each including the polymer, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

According to an embodiment of the present inventive concept, there is provided a novel polymer including a first repeating unit represented by Formula 1 below:

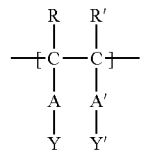

Formula 1

In Formula 1 above,

R and R' are each independently a hydrogen atom, a substituted or unsubstituted

C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group;

A and A' are each independently —C(C═O)O—, —C(C═O)—, —OS(═O)$_2$O—, —S(═O)$_2$O—, —S(═O)O—, —OP(═O)O$_2$—, or —P(═O)O$_2$—; and Y and Y' are each independently a hydrogen atom, an alkali metal, an ammonium group, or —NH$_2$, provided that Y and Y' may not simultaneously be hydrogen atoms or —NH$_2$.

In Formula 1, A and A' are divalent groups and may be each independently a carboxylate group (—C(C═O)O—), a sulfate group (—OS(═O)$_2$O—), a sulfite group (—S(═O)$_2$O—), a sulfinate group (—S(═O)O—), a phosphate group (—OP(═O)O$_2$—), a phosphonate group (—P(═O)O$_2$—), or a carbonyl group as described above.

When A and A' are each independently a phosphate group or a phosphonate group, -A-Y may be selected from the functional groups represented by Structural Formula 1 below, and -A'-Y' may be selected from the functional groups represented by Structural Formula 2 below:

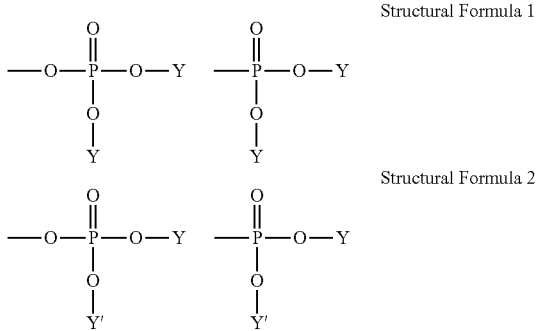

Structural Formula 1

Structural Formula 2 wherein in Structural Formulae 1 and 2, Y and Y' are each independently a hydrogen atom, an alkali metal, or an ammonium group, provided that Y and Y' may not simultaneously be hydrogen atoms.

The first repeating unit of Formula 1 above may be represented by Formula 2 or 2a below.

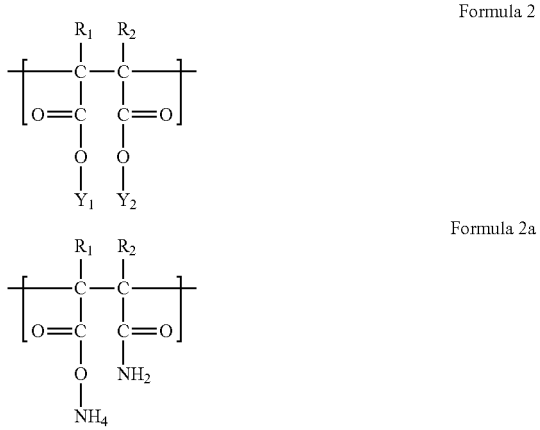

Formula 2

Formula 2a

In Formulae 2 and 2a, $R_1$ and $R_2$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group; and $Y_1$ and $Y_2$ are each independently a hydrogen atom, an alkali metal, ammonium group, or —$NH_2$, provided that $Y_1$ and $Y_2$ may not simultaneously be hydrogen atoms or —$NH_2$.

Examples of the ammonium group are unsubstituted ammonium group —$NH_4$ or an ammonium group substituted with one to three substituents including at least one of a C1-C30 alkyl group, a C6-C30 aryl group, a C7-C30 arylalkyl group, a C1-C30 heteroaryl group, a C4-C30 carbocyclic group, and a C1-C30 heterocyclic group.

The polymer may further include a second repeating unit. The second repeating unit may include a divalent aliphatic organic group repeating unit or a divalent cycloaliphatic organic group repeating unit.

The divalent aliphatic organic group repeating unit may refer to a repeating unit such as a substituted or unsubstituted C1-C30 alkylene group or a substituted or unsubstituted C2-C30 alkynylene group, and in some embodiments, may refer to a repeating unit such as a C1-C15 alkylene group, a C2-C15 alkenylene group, or a C2-C15 alkynylene group.

The divalent alicyclic organic group repeating unit may refer to a repeating unit such as C3-C30 cycloalkylene group, C3-C30 cycloalkenylene group, or a C3-C30 cycloalkynylene group, and in some embodiments, may refer to a C3-C15 cycloalkylene group, a C3-C15 cycloalkenylene group, or a C3-C15 cycloalkynylene group.

The second repeating unit may be a second repeating unit represented by Formula 3 below.

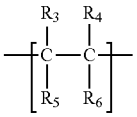

Formula 3

In Formula 3, $R_3$ to $R_6$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C2-C30 heterocyclic alkyl group; or $R_3$ and $R_4$, or $R_5$ and $R_6$ may be independently linked together to form a ring, wherein the ring may be a C6-C10 cycloalkyl group, a C3-C10 heteroaryl group, a fused C3-C10 heteroaryl group, a C3-C10 heterocyclic group, or a fused C3-C10 heterocyclic group.

In some embodiments, the polymer may further include a third repeating unit represented by Formula 4a or 4b below:

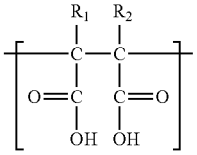

Formula 4a

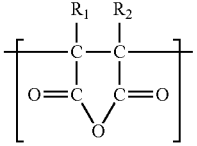

Formula 4b

In Formulae 4a and 4b, $R_1$ and $R_2$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group.

The polymer may be a polymer including a first repeating unit represented by Formula 4 or 4g below, a second repeating unit represented by Formula 5 below, and a third repeating unit represented by Formula 4a or 4b below.

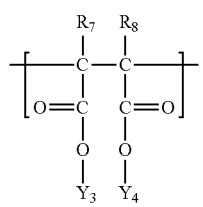

Formula 4

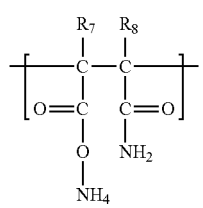

Formula 4g

In Formulae 4 and 4g, $R_7$ and $R_8$ may be each independently a hydrogen atom or a C1-C10 alkyl group;

$Y_3$ and $Y_4$ are each independently a hydrogen atom, Li, Na, K, or $NH_4$, provided that $Y_3$ and $Y_4$ are not simultaneously hydrogen atoms; and a, which indicates a mole fraction of the first repeating unit, may be from 0.01 to 0.99.

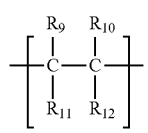

Formula 5

In Formula 5, $R_9$ to $R_{12}$ are each independently a hydrogen atom or a C1-C10 alkyl group.

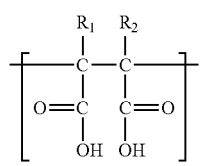

Formula 4a

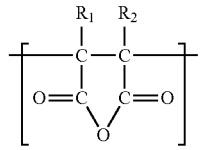

Formula 4b

In Formulae 4a and Formula 4b, $R_1$ and $R_2$ may be each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group.

A sum of a mole fraction of the first repeating unit and a mole fraction of the second repeating unit may be 1. For example, mole fractions of the first repeating unit and the second repeating unit may be each from about 0.01 to 0.99.

A sum of a mole fraction of the second repeating unit and a mole fraction of the third repeating unit may be 1. For example, mole fractions of the second repeating unit and the third repeating unit may be each from about 0.01 to 0.99.

In some embodiments, the polymer including the first repeating unit represented by Formula 4 or 4g, the second repeating unit represented by Formula 5, and the third repeating unit represented by Formula 4a or 4b may have a degree of polymerization of from about 100 to about 50,000.

According to another embodiment of the present inventive concept, there is provided a polymer as a reaction product of (i) an alkali metal- or ammonium group-containing base and (ii) a polymer A including a first repeating unit represented by Formula 4c or Formula 4d below, and a second repeating unit selected from a divalent aliphatic organic group repeating unit and a divalent alicyclic organic group repeating unit.

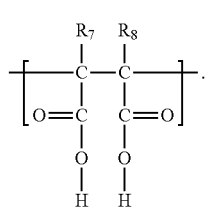

Formula 4c

In Formula 4c, $R_7$ and $R_8$ are each independently a hydrogen atom or a C1-C10 alkyl group.

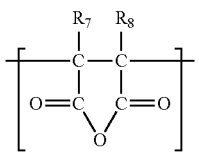

Formula 4d

In Formula 4d, $R_7$ and $R_8$ are each independently a hydrogen atom or a C1-C10 alkyl group; and a mole fraction of the first repeating unit is from about 0.01 to about 0.99 and a mole fraction of the second repeating unit is from about 0.01 to about 0.99.

In some embodiments, the second repeating unit of the polymer A may be a second repeating unit represented by Formula 5 below.

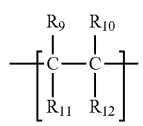

Formula 5

In Formula 5, $R_9$ to $R_{12}$ are each independently a hydrogen atom or a C1-C10 alkyl group.

In some embodiments, the polymer which is a reaction product of i) the alkali metal- or ammonium group-containing base and ii) the polymer A including a first repeating unit of Formula 4c or 4d and a second repeating unit selected from a divalent aliphatic organic group repeating unit and a divalent alicyclic organic group repeating unit may have a degree of polymerization of from about 100 to about 50,000.

The reaction product may be obtained by mixing the polymer including the first repeating unit represented by Formula 4c or Formula 4d and the second repeating unit selected from a divalent aliphatic organic group repeating unit and a divalent alicyclic organic group repeating unit, the alkali metal- or ammonium group-containing base, and water to obtain a mixture; and thermally treating the mixture at a temperature of from about 20° C. to about 100° C., and in an embodiment, from 50° C. to 80° C.

The alkali metal- or ammonium group-containing base may be any base including an alkali metal or ammonium group. As non-limiting examples of the alkali metal- or ammonium group-containing base, at least one selected from lithium hydroxide, sodium hydroxide, potassium hydroxide, and ammonium hydroxide may be used. An amount of the alkali metal- or ammonium group-containing base may be from about 0.2 mole to 1.0 mole, and in an embodiment, about 0.4 to 0.8 mole based on 1 mole of the polymer including the first repeating unit of Formula 4c or 4d and the second repeating unit of Formula 5. When the amount of the alkali metal- or ammonium group-containing base is within the foregoing ranges, a polymer with an intended degree of substitution with the alkali metal or ammonium group may be obtained.

A substitution degree with an alkali metal or ammonium group in the polymer may be from about 0.2 to about 1.0, and in some embodiments, from about 0.4 to about 1.0. An example of the alkali metal is lithium. An example of the ammonium group is $NH_4$. An example of the alkali metal-containing base is lithium hydroxide. An example of the ammonium-containing base is ammonium hydroxide.

In some embodiments, the polymer including the first repeating unit of Formula 4c or 4d and the second repeating unit of Formula 5 may have a weight average molecular weight of from about 50,000 to about 500,000, and in an embodiment, from about 100,000 to about 500,000. When the weight average molecular weight of the polymer is within the foregoing ranges, the viscosity of the polymer containing composition may be appropriate for manufacturing of an electrode.

In some embodiments, the polymer including the first repeating unit of Formula 4c or 4d and the second repeating unit of Formula 5 prepared as described above may exhibit two proton peaks from at least one of maleic anhydride and maleic acid in the polymer chain in a chemical shift range of from 2.65 parts per million ("ppm") to 2.75 ppm and from 2.2 ppm to 2.4 ppm in a $^1H$ nuclear magnetic resonance ("$^1H$-NMR") spectrum.

In the $^1H$-NMR spectra of the polymer, a peak integration ratio of the proton peak in a chemical shift range of 2.2 ppm to 2.4 ppm to the proton peak in a chemical shift range of 2.65 ppm to 2.75 ppm may be from about 0.95 to about 1.05.

In some embodiments, the polymer composition may further include water.)

In some embodiments, the polymer may include a first repeating unit of Formula 6 or 6c below, a second repeating unit of Formula 7 below, and a third repeating unit represented by Formula 4e:

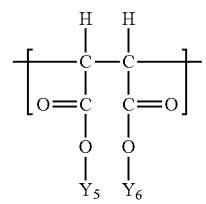

Formula 6

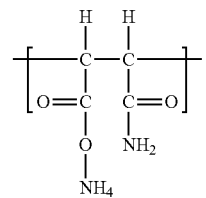

Formula 6a

In Formula 6, $Y_5$ and $Y_6$ are each independently a hydrogen atom, Li, Na, K, an ammonium group or $NH_2$, provided that $Y_5$ and $Y_6$ may not simultaneously be hydrogen atoms or $NH_2$.

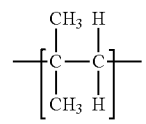

Formula 7

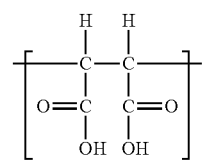

Formula 4e

-continued

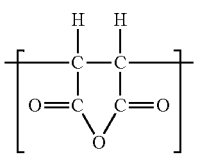

Formula 4h

In some embodiments, the polymer including the first repeating unit of Formula 6 or 6a, the second repeating unit of Formula 7, and the third repeating unit of Formula 4e may have a degree of polymerization of from about 100 to about 50,000, and in an embodiment, from about 1,000 to about 50,000.

In the polymer according to any of the above-embodiments of the present invention, a sum of a mole fraction of the first repeating unit of Formula 6 or Formula 6e in the polymer and a mole fraction of the second repeating unit of Formula 7 maybe) 1. For example, mole fractions of the first repeating unit and the second repeating unit may be each from about 0.01 to 0.99.

In the polymer according to any of the above-embodiments of the present invention, a sum of a mole fraction of the second repeating unit of Formula 7 above and a mole fraction of the third repeating unit of Formula 4e or 4h may be 1. For example, mole fractions of the second repeating unit and the third repeating unit may be each from about 0.01 to 0.99.

In some embodiments, the polymer including the first repeating unit of Formula 6 or 6a, the second repeating unit of Formula 7, and the third repeating unit of Formula 4e may be a polymer represented by Formula 8 or 8z below.

Formula 8

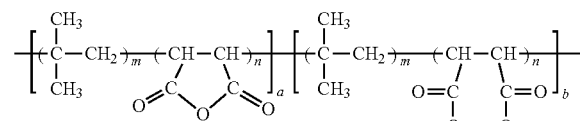

Formula 8z

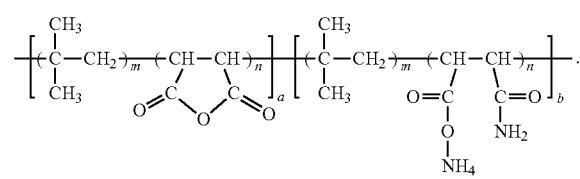

In Formulae 8 and 8z, i) $Y_7$ and $Y_8$ may be both lithium, or ii) one of $Y_7$ and $Y_8$ may be lithium, and the rest may be a hydrogen atom;

a may be a mole fraction of 0 or from about 0.01 to about 0.99, b may be a mole fraction of 1 or from about 0.01 to about 0.99, and a+b=1; and m may be a mole fraction from about 0.01 to about 0.99, n may be a mole fraction from about 0.01 to about 0.99, and m+n=1.

The polymer represented by Formula 8 or 8z may have a degree of polymerization from about 100 to about 50000.

In some embodiments, the polymer represented by Formula 8 or 8z may be an alternating polymer, a random polymer, or a block polymer depending on an arrangement pattern of the first repeating unit and the second repeating unit.

In an embodiment, the polymer may have a lithium content of about 2 wt % to about 15 wt %, as measured by inductively coupled plasma atomic emission spectroscopy (ICP-AES). When the lithium content of the polymer is within the forgoing range, a lithium battery employing the polymer may be improved in lifetime and initial efficiency.

In an embodiment, the polymer may be prepared as a polymer composition by adding water. An amount of the water in the polymer composition may be from about 400 parts to about 5000 parts by weight based on 100 parts by weights of the polymer. When the amount of the water is within this range, the polymer may have good solubility, and a resulting composition of the polymer may have a viscosity appropriate for forming an electrode active material layer.

Particle size and surface area of electrode active materials are significant factors affecting battery characteristics. The smaller the particle size and the larger the surface area of the electrode active material, the better the performance of the battery becomes, for example, in terms of power output, capacity and discharge capacity at low temperatures and high rates. However, a smaller particle size and larger specific surface area of the electrode active material may lead to an increased contact area between the electrode active material and the electrolytic solution, so that side reaction between the electrolytic solution and the electrode active material may more likely occur during initial lithium intercalation. This may lead to an increased initial irreversible capacitance of the electrode active material, and consequently a low initial efficiency of the lithium battery, and thus there has been a demand for further improvement in this regard.

A high initial efficiency of the lithium battery may lead to a higher actual capacity relative to a designed capacity, and consequently a higher energy density. In this regard, to increase the initial efficiency of a battery, design control is required to prevent a direct contact between the electrode active material and the electrolytic solution.

In some embodiments, the polymer in the polymer composition, as a water-soluble polymer containing an alkali metal such as lithium, or an ammonium group, may be used as a binder. The polymer used as a binder may coat a surface of the electrode active material, thus efficiently blocking the electrode active material from contacting the electrolytic solution. Consequently, side reactions between the electrode active material and the electrolytic solution may less likely occur, as compared with using a conventional water-soluble binder, and thus the initial efficiency of the lithium battery may be improved.

In the polymer of the polymer composition according to the above embodiments, coordination of lithium ions by oxygen atoms from —C(C=O)O— forms a conducting path of the lithium ions, as illustrated by the following formulae.

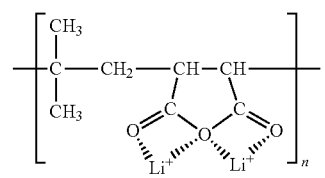

-continued

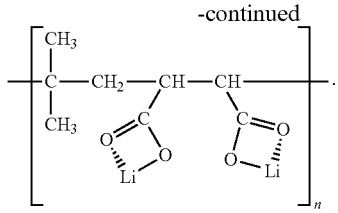

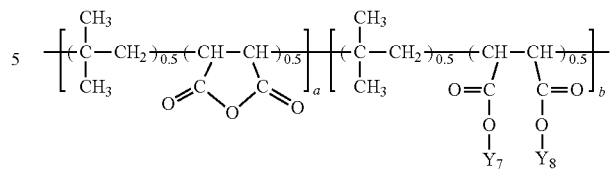

Formula 8e

In the formulae above, a mole fraction of each repeating unit is not described for convenience of explanation. The polymer may have a degree of polymerization n of from about 100 to about 50,000, and in an embodiment, from about 1,000 to about 50,000.

The formation of the conducting paths of lithium ions as described above may facilitate lithium substitution reaction by two times or more, as compared to when a lithium poly- In Formula 8e, i) $Y_7$ and $Y_8$ may be both lithium, and/or ii) one of $Y_7$ and $Y_8$ may be lithium, and the rest may be a hydrogen atom; and a may be a mole fraction of 0.2, 0.3, 0.4, 0.5, or 0.8, and a+b may be 1.

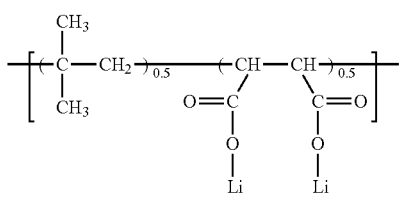

Formula 8b

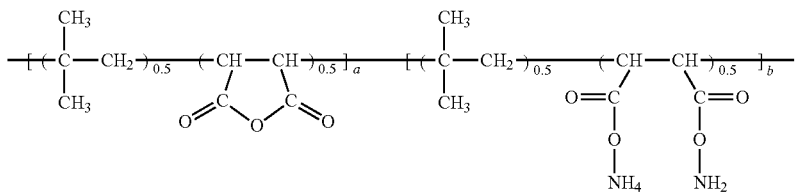

Formula 9

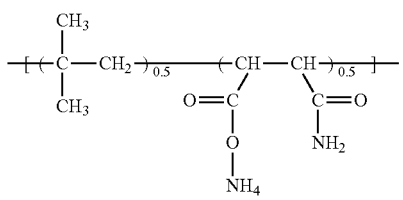

Formula 9a acrylate is used as a binder. Therefore, when an electrode active material layer is formed using the polymer composition as an electrode binder, an electrode with improved ion conductivity may be obtained.

Furthermore, with the use of the polymer composition as an electrode binder, the polymer of the polymer composition may form an organic pre solid Electrolyte interface ("pre-SEI") film on a surface of the electrode active material to cover defects of the electrode active material and block direct contact between the electrode active material and the electrolytic solution, thus suppressing side reactions and consequently improving the initial efficiency of the lithium battery.

In some embodiments, the polymer may be a polymer represented by Formula 8e, Formula 8b, Formula 9, or Formula 9a below.

The polymer represented by Formula 8e may also be represented by Formula 8f below.

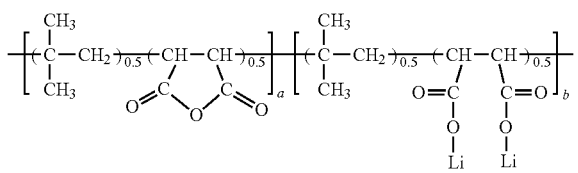

Formula 8f

In Formula 8f, a may be a mole fraction of 0.2, 0.3, 0.4, 0.5, or 0.8, and a+b may be 1.

According to embodiments of the present inventive concept, there is provided a polymer represented by Formula 10 or Formula 10a below.

Formula 10

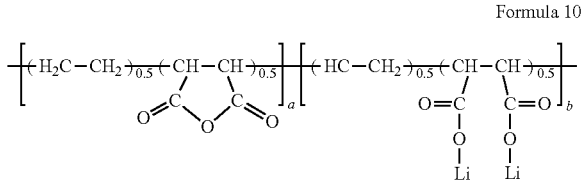

In Formula 10, a and b may be each a mole fraction of 0.5.

Formula 10a

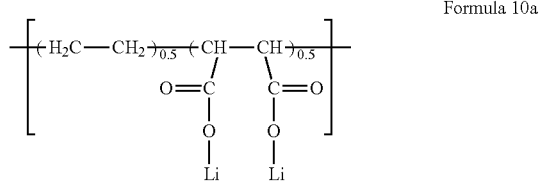

The polymer of Formula 10 or 10a above may have a degree of polymerization from about 2,500 to about 3,500.

In the polymers according to the above-described embodiments, when two repeating units distinguished in parentheses have the same mole fraction, the mole fractions of the repeating units are omitted.

Hereinafter, a method of preparing a polymer composition for lithium batteries, according to an embodiment of the present inventive concept, will be described in greater detail. As an example, preparing a polymer composition using the polymer represented by Formula 8 above will be described.

First, a polymer represented by Formula 9c below or a polymer represented by Formula 9d is mixed with an alkali metal- or ammonium group-containing base, and water to obtain a mixture:

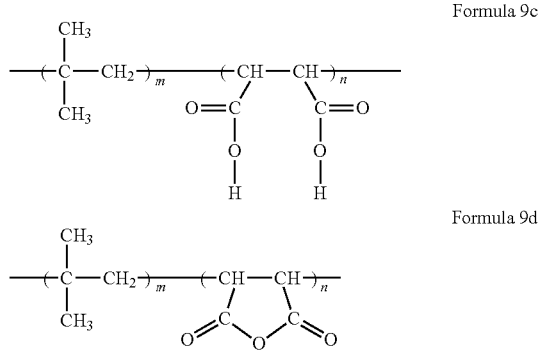

In Formulae 9c and 9d, m and n may be each a mole fraction from about 0.01 to about 0.99.

The polymer of Formula 9c or 9d may have a degree of polymerization from about 100 to about 50,000.

The mixture is thermally treated at a temperature of from about 20° C. to about 95° C. to obtain the polymer composition including the polymer of Formula 8 above.

An amount of the water may be from about 400 parts to about 5000 parts by weight based on 100 parts by weights of the polymer. When the amount of the water is within this range, the polymer may have good solubility, and a resulting composition of the polymer may have a viscosity appropriate for forming an electrode active material layer.

The type and amount of the alkali metal- or ammonium group-containing base may directly affect a degree of substitution of the alkali metal or ammonium group, and in particular, a substitution degree of lithium, in the polymer of Formula 8.

The alkali metal- or ammonium group-containing base may be at least one selected from lithium hydroxide, potassium hydroxide, sodium hydroxide, and ammonium hydroxide.

An amount of the alkali metal- or ammonium group-containing base may be adjusted, so that the amount of the alkali metal or ammonium group is from about 0.2 moles to 1 mole based on 1 mole of the polymer of Formula 9 or 9A. When the amount of the alkali metal or ammonium group-containing base is 0.2 moles, this means that a degree of the alkali metal or ammonium group (for example lithium) substitution in the polymer product polymer of Formula 8 as a final product may be 0.2 at a 100% yield. Here, the term yield means a reaction yield of a reaction between the polymer represented by Formula 9 below or the polymer represented by Formula 9A and the alkali metal- or ammonium group-containing base. As described above, a degree of the alkali metal or ammonium group (for example, lithium) substitution may be determined based on the amount of an alkali metal- or ammonium group-containing base used to prepare a polymer.

A degree of reaction progress of mixture including the polymer of Formula 9 or 9A, the alkali metal- or ammonium group-containing base, and water may be identified by measuring a pH of the reaction mixture.

For example, a pH of the reaction mixture may be about 14 at an initial reaction stage, and may reach up to 7.5 to 8.5 with reaction progress. Accordingly, a pH of the reaction mixture of 7.5 to 8.5 may be regarded as termination of the reaction.

An amount of the water in the polymer composition may be from about 400 parts to about 600 parts by weight, and an embodiment, about 500 parts by weight based on 100 parts by weight of the polymer of Formula 9 or 9A. When the amount of the water is within this range, the polymer composition may have an appropriate viscosity for coating.

The thermal treatment temperature may be, for example, from about 20° C. to about 95° C. When the thermal treatment temperature is within this range, it may be easy to control a substitution degree of the alkali metal or ammonium group (for example, lithium) when desired.

The polymer of Formula 8 may be obtained through removing the water from the polymer composition. The removing of the water refers to thermally treating the polymer composition at a temperature of from about 80° C. to 100° C. to be dried.

In some embodiments, when the alkali metal- or ammonium group-containing base is lithium hydroxide, in Formula 8 of the target polymer, at least one of $Y_7$ and $Y_8$ may be lithium.

In the polymer of Formula 8, a degree of lithium substitution may be from about 0.2 to about 1.0, and in some embodiments, from about 0.4 to about 1.0.

The terms "a degree of lithium substitution" is defined as follows.

When a degree of polymerization of a polymer is denoted as d, and the first repeating unit of Formula 1 has two substitution sites for lithium, a total number of substitution sites for lithium in the polymer may be 2d. A degree of lithium substitution indicates a ratio of the substitution sites substantially substituted with lithium to the total number of lithium substitution sites of 2d.

When the total number of lithium substitution sites of 2d is all substituted with lithium, a degree of lithium substitution may be defined as 1. For example, a degree of lithium substitution of 0.56 means that a number of lithium substitution sites equal to 2d×0.56 is substituted with lithium.

The degree of lithium substitution may be controlled within a desired range by adjusting a mixing ratio of starting materials used to obtain a polymer. For example, a lithium-substituted polymer with a desired degree of lithium substitution may be obtained by adjusting a mole ratio of a polymer including the first repeating unit of Formula 1 above and a substituted or unsubstituted C2-C30 alkenyl second repeating unit, and a lithium source (for example, lithium hydroxide).

A degree of substitution of alkali metal substitution or a degree of substitution of an ammonium group may also be defined as described above in conjunction with the degree of lithium substitution.

According to another embodiment of the present inventive concept, an electrode for lithium batteries includes the above-described polymer composition. The electrode may be manufactured by mixing an electrode active material and a polymer composition including the polymer to prepare an electrode active material composition, and coating and drying the electrode active material composition on an electrode current collector to form the electrode having an electrode active material layer.

The electrode may be, for example, a negative electrode.

The electrode may include a product resulting from the coating and drying of the mixture of the polymer composition and the electrode active material, and for example, a product from removing water from the polymer composition to contain the polymer and the electrode active material. The drying may be performed at a temperature of about 80☐ to about 120☐.

In some other embodiments, the polymer composition may be used, in addition to as an electrode binder, as a separator or a coating material of a polymer electrolyte surface.

When mixed with an electrode active material, the polymer composition may form an electrode active material composition.

Examples of the electrode active material, and in particular, as a negative electrode active material are a carbonaceous material, silicon, silicon oxide, a silicon-based alloy, a silicon-carbonaceous material composite, tin, a tin-based alloy, a tin-carbon composite, a metal oxide, or a combination thereof.

Examples of a carbonaceous material include crystalline carbon, amorphous carbon, and combinations thereof. Examples of the crystalline carbon are graphite, such as natural graphite or artificial graphite that are in an amorphous, plate, flake, spherical, or fibrous form. Examples of the amorphous carbon are soft carbon (carbon sintered at low temperatures), hard carbon, meso-phase pitch carbides, sintered corks, and the like.

The carbonaceous material may include carbon, graphite, or carbon nanotubes.

The negative electrode active material may be Si, SiOx (0<x<2, for example, x is from 0.5 to 1.5), Sn, SnO2, a silicon-containing metal alloy, or mixtures thereof. A metal alloyable with silicon to form a silicon alloy may be at least one selected from Al, Sn, Ag, Fe, Bi, Mg, Zn, In, Ge, Pb, and Ti.

The negative electrode active material may include a metal/semi-metal alloyable with lithium, an alloy thereof, or an oxide thereof. Examples of the metal/semi-metal alloyable with lithium are Si, Sn, Al, Ge, Pb, Bi, Sb, a Si—Y alloy (where Y is an alkali metal, an alkali earth metal, a Group 13 element, a Group 14 element, a transition metal, a rare earth element, or a combination thereof except for Si), a Sn—Y alloy (where Y is an alkali metal, an alkali earth metal, a Group 13 element, a Group 14 element, a transition metal, a rare earth element, or a combination thereof except for Sn), and MnOx (0<x≤2). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof. Non-limiting examples of the oxide of the metal/semi-metal alloyable with lithium are a lithium titanium oxide, a vanadium oxide, and a lithium vanadium oxide, SnO$_2$, and SiOx (0<x<2).

For example, the negative electrode active material may include at least one element selected from the elements of Groups 13, 14, and 15 of the periodic table of elements.

In some other embodiments, the negative electrode active material may include at least one element selected from Si, Ge, and Sn.

The negative electrode active material may be a mixture or composite of a carbonaceous material with one selected from silicon, silicon oxide, and a silicon-containing metal alloy as listed above.

In some embodiments, the negative electrode active material may have a simple particulate form, or may be a nanostructure having a nanosize. In some embodiments, the negative electrode active material may have any of a variety of forms, for example, nanoparticles, nanowires, nanorods, nanotubes, or nanobelts.

In some embodiments, the negative electrode active material may include graphite, a Si-CNT composite, a nanosized manganese oxide (MnOx, 0<x≤2).

The graphite may have an average particle diameter of from about 0.5 μm to about 2 μm, and in some embodiments, about 1 μm. In some embodiments, the graphite may have a particle diameter (D90) of from about 5 μm to about 7 μm, for example, about 6.5 μm. As used herein, "D90" represents a particle diameter corresponding to a 90% cumulative amount from the smallest or largest diameter with respect to the total amount (100%) in a cumulative curve of number-based particle size distribution.

The negative electrode may be manufactured as follows.

For example, the negative electrode may be manufactured by coating a current collector, for example, a copper foil, with a negative electrode active material composition including a negative electrode active material and a polymer composition including a polymer according to any of the above-described embodiments as a binder.

The negative electrode active material and the polymer as binder may be mixed together to prepare the negative electrode active material composition.

The polymer composition may contain water. The negative electrode active material composition may include a conducting agent.

The negative electrode active material composition may be coated on the current collector to manufacture the negative electrode.

In manufacturing the negative electrode, an amount of the polymer in the polymer composition may be from about 1 part to about 30 parts by weight, and in some embodiments, from about 2 parts to about 20 parts by weight, based on 100 parts by weight of a total amount of the negative electrode active material composition.

The coating of the negative electrode active material composition is not limited to a specific method, and may be performed by a method selected from screen printing, spray coating, coating using a doctor blade, Gravure coating, dip coating, silk screen, painting, and coating using a slot die.

In general, the current collector may be manufactured to have a thickness of about 3 μm to about 20 μm, and in an embodiment, about 5 μm to about 15 μm.

After being coated on the current collector and/or a substrate, the negative electrode active material composition is dried at about 80° C. to about 120° C. (primary heating) to remove the solvent, and is then roll-pressed, followed by drying to obtain the negative electrode.

When the drying temperature in the primary heating for removing water used as the solvent from the electrode is within this range, generation of air bubbles on the electrode surface may be suppressed, so that an electrode with improved surface uniformity may be obtained. The drying may be performed in an atmospheric condition.

The primary heating may be followed by secondary heating in a vacuum. The secondary heating may be performed at a vacuum of from about 1×10−4 to about 1×10−6 torr at a temperature of from about 100° C. to about 200° C.

The negative electrode active material composition may further include, in addition to a negative electrode active material as listed above, a carbonaceous negative electrode active material.

Examples of the carbonaceous negative electrode active material are crystalline carbon, amorphous carbon, and mixtures thereof. Non-limiting examples of the crystalline carbon are graphite, such as natural graphite or artificial graphite that are in amorphous, plate, flake, spherical or fibrous form. Non-limiting examples of the amorphous carbon are soft carbon (carbon sintered at low temperatures), hard carbon, meso-phase pitch carbides, sintered corks, graphene, carbon black, fullerene soot, carbon nanotubes, and carbon fibers. Any appropriate material available in the art may be used.

Non-limiting examples of the conducting agent are acetylene black, ketjen black, natural graphite, artificial graphite, carbon black, carbon fiber, metal powder and metal fiber of, for example, copper, nickel, aluminum, or silver, polyphenylene derivatives, or mixtures of at least one thereof. Any conducting agent available in the art may be used.

The negative electrode may further include a common binder that is widely used in the art, in addition to the above-described binder. Non-limiting examples of the common binder are sodium-carboxymethylcellulose ("Na-CMC"), alginic acid derivatives, chitosan derivatives, polyvinylalcohol ("PVA"), polyacrylic acid ("PAA"), polysodium acrylate ("Na-PAA"), polyvinylpyrrolidone ("PVP"), polyacrylamide, polyamideimide, a vinylidene fluoride/hexafluoropropylene copolymer ("P(VDF-HFP)"), polyvinylidenefluoride ("PVDF"), polyacrylonitrile ("PAN"), aqueous-dispersion type styrene-butadiene rubber ("SBR"), aqueous-dispersion type butadiene rubber ("BR"), a modified product thereof (for example, a fluorinated polymer or a polymer with a sulfone ($-SO_2-$) substituent in a main chain), or a copolymer thereof (for example, a random copolymer, a block copolymer, or an alternating polymer with other polymers).

The current collector is not particularly limited, and may be any materials so long as it has a suitable conductivity without causing chemical changes in the manufactured battery. Examples of the current collector are copper, stainless steel, aluminum, nickel, titanium, sintered carbon, copper or stainless steel that is surface-treated with carbon, nickel, titanium or silver, and aluminum-cadmium alloys.

In addition, the current collector may be processed to have fine irregularities on a surface thereof so as to enhance adhesion of the current collector to the negative electrode active material, and may be used in any of a variety of forms, including films, sheets, foils, nets, porous structures, foams, and non-woven fabrics.

When the electrode is a positive electrode, a compound (lithiated intercalation compound) which allows reversible intercalation and deintercalation of lithium may be used as a positive electrode active material. The positive electrode active material may include at least one selected from lithium cobalt oxide, lithium nickel cobalt manganese oxide, lithium nickel cobalt aluminum oxide, lithium iron phosphorous oxide, and lithium manganese oxide. The positive electrode active material is not limited to these examples, and may be any positive electrode active material available in the art.

For example, the positive electrode active material may be at least one selected from lithium cobalt oxide ($LiCoO_2$); lithium nickel oxide ($LiNiO_2$); lithium manganese oxides, including $Li_{1+x}Mn_{2-x}O_4$ (where x is from 0 to 0.33), $LiMnO_3$, $LiMn_2O_3$, and $LiMnO_2$; lithium copper oxide ($Li_2CuO_2$); lithium iron oxide ($LiFe_3O_4$); lithium vanadium oxide ($LiV_3O_8$); copper vanadium oxide ($Cu_2V_2O_7$); vanadium oxide ($V_2O_5$); lithium nickel oxide ($LiNi_{1-x}M_xO_2$, where M is Co, Mn, Al, Cu, Fe, Mg, B, or Ga; and x is from 0.01 to 0.3); lithium manganese oxides, including $LiMn_{2-x}M_xO_2$ (where M is Co, Ni, Fe, Cr, Zn, or Ta; and x is from 0.01 to 0.1) and $Li_2Mn_3MO_8$ (where M is Fe, Co, Ni, Cu, or Zn); lithium manganese oxide ($LiMn_2O_4$) with partial substitution of lithium by alkali earth metal ions; disulfide compound; and iron molybdenum oxide ($Fe_2(MoO_4)_3$).

For example, the positive electrode active material may be a compound represented by one of the following formula: $Li_aA_{1-b}B_bD_2$ (where $0.90 \le a \le 1.8$, and $0 \le b \le 0.5$); $Li_aE_{1-b}B_bO_{2-c}D_c$ (where $0.90 \le a \le 1.8$, $0 \le b \le 0.5$, and $0 \le c \le 0.05$); $LiE_{2-b}B_bO_{4-c}D_c$ (where $0 \le b \le 0.5$, and $0 \le c \le 0.05$); $Li_aNi_{1-b-c}Co_bB_cD_\alpha$ (where $0.90 \le a \le 1.8$, $0 \le b \le 0.5$, $0 \le c \le 0.05$, and $0 \le \alpha \le 2$); $Li_aNi_{1-b-c}Co_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (where $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_\alpha$ (where $0.90 \le a \le 1.8$, $0 \le b \le 0.5$, $0 \le c \le 0.05$, and $0 < \alpha < 2$); $Li_aNi_bE_cG_dO_2$ (where $0.90 \le a \le 1.8$, $0 \le b \le 0.9$, $0 \le c \le 0.5$, and $0.001 \le d \le 0.1$); $Li_aNi_bCo_cMn_dGeO_2$ (where $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.8$, and $0.001 \le b \le 0.1$); $Li_aCoG_bO_2$ (where $0.90 \le a \le 1.8$, and $0.001 \le b \le 0.1$); $Li_aMnG_bO_2$ (where $0.90 \le a \le 1.8$, and $0.001 \le b \le 0.1$); $Li_aMn_2G_bO_4$ (where $0.90 \le a \le 1.8$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the formulae above, A is selected from nickel (Ni), cobalt (Co), manganese (Mn), and combinations thereof; B is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from oxygen (O), fluorine (F), sulfur (S), phosphorus (P), and combinations thereof; E is selected from cobalt (Co), manganese (Mn), and combinations thereof; F is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.

The compounds listed above as positive electrode active materials may have a surface coating layer (hereinafter, "coating layer"). Alternatively, a mixture of a compound without having a coating layer and a compound having a coating layer, the compounds being selected from the compounds listed above, may be used. The coating layer may include at least one compound of a coating element selected from oxide, hydroxide, oxyhydroxide, oxycarbonate, and hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any of the above-listed compounds including these elements, according to any appropriate method that does not adversely affect physical properties of the positive electrode active material when a compound of the coating element is used. For example, the coating layer may be formed using spray-coating, dipping, or other materials known to one of ordinary skill in the art. Non-limiting examples of the positive electrode active material are $LiNiO_2$, $LiCoO_2$, $LiMn_xO_{2x}$ (where x=1, 2), $LiNi_{1-x}Mn_xO_2$ (where 0<x<1), $LiNi_{1-x-y}Co_xMn_yO_2$ (where x is 0 or 0.5, and y is 0 or 0.5), $LiFeO_2$, $V_2O_5$, TiS, and MoS.

As a binder for the positive electrode, the positive composition according to the above-described embodiments may be used. The binder strongly binds positive electrode active material particles to each other and to a current collector. As typical examples, the binder may be at least one of polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), polyamideimide, acrylated SBR, epoxy resin, and nylon, but is not limited thereto.

In preparing the positive electrode active material composition, the same conducting agent as used in the negative electrode active material composition may be used.

The positive electrode active material, positive electrode active material, the binder, and the conducting agent may be mixed together to obtain a positive electrode active material layer composition.

When the positive composition according to the one or more embodiments of the present inventive concept is used as a binder in forming the positive electrode active material layer, a solvent needs not be used.

When a common positive electrode binder is used in forming the positive electrode active material layer, a solvent may be used. Non-limiting examples of the solvent are water, dimethylsulfoxide ("DMSO"), N,N-dimethylformamide ("DMF"), N,N-dimethylacetamide ("DMA"), tetrahydrofuran ("THF"), 1,4-dioxane, 1,2-dimethoxyethane ("DME"), and N-methylpyrrolidone ("NMP").

A positive electrode using the positive electrode active material composition may be manufactured in the same manner as in the manufacture of the negative electrode, except that the positive electrode active material, instead of the negative electrode active material, is used.

The amounts of the positive electrode active material, the conducting agent, and the solvent may be those levels that are generally used in the manufacture of lithium batteries in the art. At least one of the conducting agent and the solvent may not be used according to the use and the structure of the lithium battery. Any kind of various additives, for example, a dispersing agent, a thickening agent, or a filler, may be further used in the manufacture of the positive electrode if required.

According to another embodiment of the present inventive concept, a lithium battery includes the above-described negative electrode, the positive electrode, a separator, and a lithium salt-containing non-aqueous electrolyte.

The separator may be disposed between the positive electrode and the negative electrode. The separator may be an insulating thin film having a high ion permeability and strong mechanical strength.

The separator may have a pore diameter of from about 0.01 μm to about 10 μm, and in an embodiment, from about 1 μm to about 10 μm, and a thickness of from about 5 μm to about 20 μm, and in an embodiment, from about 10 μm to about 15 μm. Examples of the separator are olefin-based polymers, such as polyethylene, polypropylene, polybutylene, and sheets or non-woven fabric made of glass fiber or polyethylene. When a solid electrolyte, for example, a polymer electrolyte, is used as the electrolyte, the solid electrolyte may also serve as the separator.

The separator may be a monolayer or a multilayer including at least two layers of olefin-based polymer, for example, polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene, and polypropylene layers.

The lithium salt-containing non-aqueous electrolyte may contain a non-aqueous electrolyte solution and a lithium salt.

The non-aqueous electrolyte may be a non-aqueous liquid electrolyte, an organic solid electrolyte, or an inorganic solid electrolyte.

Non-limiting examples of the non-aqueous liquid electrolyte are any of aprotic organic solvents such as N-methyl-2-pyrrolidone, propylene carbonate, ethylene carbonate ("EC"), butylene carbonate, dimethyl carbonate, diethyl carbonate ("DEC"), γ-butyrolactone, 1,2-dimethoxyethane ("DME"), tetrahydrofuran ("THF"), 2-methyltetrahydrofuran ("2-methyl-THF"), dimethylsulfoxide ("DMSO"), 1,3-dioxolane, 1,4-dioxane, formamide, N,N-dimethylformamide ("DMF"), N,N-dimethylacetamide ("DMA"), acetonitrile, nitromethane, methylformate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and fluoroethylene carbonate ("FEC").

Non-limiting examples of the organic solid electrolyte are polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Non-limiting examples of the inorganic solid electrolyte are nitrides, halides and sulfates of lithium such as $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt may be any lithium salt that is soluble in the above-mentioned non-aqueous electrolyte. Non-limiting examples of the lithium salt are LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carboxylate, and lithium tetrakisphenyl borate. To improve charge/discharge characteristics or flame-retardancy, the non-aqueous electrolyte may be further added with, for example, pyridine, triethylphosphite, triethanolamine, cyclic ether, ethylene diamine, n-glyme, hexamethylphosphoramide, nitrobenzene derivatives, sulfur, quinine imine dye, N-substituted oxazolidinone, N,N-substituted imidazoline, ethylene glycol dialkyl ether, an ammonium salt, pyrrole, 2-methoxyethanol, and aluminum chloride. In some other embodiments, to provide flame-resistance, a halogen-containing solvent, such as carbon tetrachloride, and ethylene trifluoride may be further used. Referring to FIG. 1, a lithium battery 1 according to an embodiment of the present inventive concept includes a positive electrode 3, a negative electrode 2, and a separator 4. The positive electrode 3, the negative electrode 2 and the separator 4 are wound or folded, and then sealed in a battery case 5. Then, the battery case 5 is filled with an organic electrolyte solution and sealed with a cap assembly 6, thereby completing the manufacture of the lithium battery 1. The battery case 5 may be a cylindrical type, a rectangular type, or a thin-film type. For example, the lithium battery 1 may be a thin-film type battery. The lithium battery 1 may be a lithium ion battery.

The lithium battery 1 may be a lithium ion battery having a charge voltage of about 4.3 V or greater.

The separator 4 may be interposed between the positive electrode 3 and the negative electrode 2 to form a battery assembly. Alternatively, the battery assembly may be stacked in a bi-cell structure and impregnated with the electrolyte solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output, for example, in a laptop computer, a smart phone, electric vehicle, and the like.

The lithium battery 1 may have improved high rate characteristics and lifetime characteristics, and thus may be applicable in an electric vehicle ("EV"), for example, in a hybrid vehicle such as plug-in hybrid electric vehicle ("PHEV").

Substituents in the formulae above may be defined as follows.

As used herein, the term "alkyl" indicates a monovalent or higher valency group derived from a completely saturated, branched or unbranched (or a straight or linear) hydrocarbon, and having the specified number of carbon atoms.

Non-limiting examples of the "alkyl" group are methyl, ethyl, n-propyl, isopropyl, n-butyl, isobutyl, sec-butyl, t-butyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C30 alkyl group substituted with a halogen atom (for example, $CCF_3$, $CHCF_2$, $CH_2F$, $CCl_3$, and the like), a C1-C30 alkoxy group, a C2-C30 alkoxyalkyl group, a hydroxyl group (—OH), a nitro group (—$NO_2$), a cyano group (—CN), an amino group (—NRR', wherein R and R' are independently hydrogen or a C1-C30 alkyl group), an amido group (—C(C=O)NRR', wherein R and R' are independently hydrogen or a C1-C30 alkyl group), a hydrazine group (—NHNRR', wherein R and R' are independently hydrogen or a C1-C30 alkyl group), a hydrazone group (—CR=NHNR'R", wherein R, R' and R" are independently hydrogen or a C1-C30 alkyl group), an azido group (—$N_3$), an amidino group (—C(=NH)NRR' wherein R and R' are independently hydrogen or a C1-C30 alkyl group), a carboxyl group (—$CO_2H$) or a salt thereof, a sulfonyl group, a sulfamoyl group, a sulfonic acid group (—$SO_3H$) or a salt thereof, a phosphoric acid group (—P(=O)(OH)$_2$) or a salt thereof, a C1-C30 alkyl group, a C2-C30 alkenyl group, a C2-C30 alkynyl group, a C1-C30 heteroalkyl group, a C6-C30 aryl group, a C7-C30 arylalkyl group, a C2-C30 heteroaryl group, a C3-C30 heteroarylalkyl group, a C2-C30 heteroaryloxy group, a C3-C30 heteroaryloxyalkyl group, or a C6-C30 heteroarylalkyloxy group.

As used herein, the term "halogen atom" indicates fluorine, bromine, chloride, iodine, and the like.

As used herein, the term "C1-C30 alkyl group substituted with a halogen atom" indicates a C1-C30 alkyl group substituted with at least one halogen atom. Non-limiting examples of the C1-C30 alkyl group substituted with at least one halogen atom are polyhaloalkyls including monohaloalkyl, dihaloalkyl, or perhaloalkyl.

As used herein, the term "monohaloalkyl" indicates an alkyl group including one iodine, bromine, and chlorine or fluorine atom. The terms "dihaloalkyl" and "polyhaloalkyl" indicate alkyl groups including at least two identical or different halogen atoms. The term "perhaloalkyl" indicates an alkyl group wherein all of the hydrogens are substituted with the same or different halogen atoms.

As used herein, the term "cycloalkyl" indicates to a saturated hydrocarbon ring group, having only carbon ring atoms and having the specified number of carbon atoms. A non-limiting example of a cycloalkyl group includes cyclohexyl.

As used herein, the term "alkenyl" indicates to a monovalent group derived from a straight or branched chain saturated aliphatic hydrocarbon, having at least one double bond, and having the specified number of carbon atoms. Non-limiting examples of the alkenyl groups include ethenyl, propenyl, isopropenyl, and hexenyl. At least one hydrogen atom of the alkenyl group may be substituted with substituents that are the same as those recited above in conjunction with the alkyl group.

As used herein, the term "alkynyl" indicates to a monovalent group derived from a straight or branched chain saturated aliphatic hydrocarbon, having at least one triple bond, and having the specified number of carbon atoms. Non-limiting examples of the alkynyl groups include ethynyl and propynyl. At least one hydrogen atom of the alkynyl group may be substituted with substituents that are the same as those recited above in conjunction with the alkyl group.

As used herein, the term "alkoxy" indicates "alkyl-O—", wherein the alkyl is the same as described above and having the specified number of carbon atoms. Non-limiting examples of the alkoxy group include methoxy, ethoxy, propoxy, 2-propoxy, butoxy, t-butoxy, pentyloxy, hexyloxy, cyclopropoxy, and cyclohexyloxy. At least one hydrogen atom of the alkoxy group may be substituted with substituents that are the same as those recited above in conjunction with the alkyl group.

As used herein, the term "aryl" group, which is used alone or in combination, indicates a monovalent group derived from an aromatic hydrocarbon containing at least one ring, and having the specified number of carbon atoms.

As used herein, the term "aryl" is construed as including a group with an aromatic ring fused to at least one cycloalkyl ring.

Non-limiting examples of the "aryl" group include phenyl, naphthyl, and tetrahydronaphthyl.

At least one hydrogen atom of the "aryl" group may be substituted with substituents that are the same as those recited above in conjunction with the alkyl group.

As used herein, the term "arylalkyl" indicates an alkyl group substituted with an aryl group, and having the specified number of atoms. Non-limiting examples of the "arylalkyl" group include benzyl, phenyl-CH$_2$CH$_2$—, and the like.

As used herein, the term "aryloxy" indicates "—O-aryl" having the specified number of carbon atoms. A non-limiting example of the aryloxy group is phenoxy. At least one hydrogen atom of the "aryloxy" group may be substituted with substituents that are the same as those recited above in conjunction with the alkyl group.

As used herein, the term "heteroaryl group" indicates a monovalent group derived from a monocyclic or bicyclic aromatic organic compound including at least one heteroatom selected from nitrogen (N), oxygen (O), phosphorous (P), and sulfur (S), wherein the rest of the cyclic atoms are carbon, and having the specified number of carbon atoms. The heteroaryl group may include, for example, one to five heteroatoms, and in some embodiments, may include a five- to ten-membered ring.

In the heteroaryl group, S or N may be present in various oxidized forms.

Non-limiting examples of a monocyclic heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

As used herein, the term "heteroaryl" is construed to include a heteroaromatic ring fused to at least one of an aryl group, a cycloaliphatic group, and a heterocyclic group.

Non-limiting examples of a bicyclic heteroaryl group are indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoqinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

At least one hydrogen atom of the "heteroaryl" group may be substituted with substituents that are the same as those recited above in conjunction with the alkyl group.

As used herein, the term "heteroarylalkyl" group indicates an alkyl group substituted with a heteroaryl group, and having the specified number of carbon atoms. A non-limiting example of the heteroarylalkyl group includes a (pyrid-2-yl)methyl group (C$_5$H$_4$NCH$_2$).

As used herein, the term "heteroaryloxy" indicates o-heteroaryl moiety, having the specified number of carbon atoms. At least one hydrogen atom of the heteroaryloxy group may be substituted with substituents that are the same as those recited above in conjunction with the alkyl group. A non-limiting examples of the heteroaryloxy group includes a (pyrid-2-yl)oxy group (C$_5$H$_4$NO).

As used herein, the term "carbocyclic" group indicates a monovalent saturated or partially unsaturated non-aromatic monocyclic, bicyclic or tricyclic hydrocarbon group, and having the specified number of carbon atoms.

Non-limiting examples of a monocyclic hydrocarbon group include cyclopentyl, cyclopentenyl, cyclohexyl, and cyclohexenyl.

Non-limiting examples of a bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl.

A non-limiting example of a tricyclic hydrocarbon group is adamantyl.

At least one hydrogen atom of the "carbocyclic group" may be substituted with substituents that are the same as those recited above in conjunction with the alkyl group.

As used herein, the term "carbocyclic alkyl" indicates an alkyl group substituted with a carbocyclic group, and having the specified number of carbon atoms. A non-limiting example of the carbocyclic alkyl group includes cyclohexylmethyl.

As used herein, the term "heterocyclic group" indicates a five- to ten-membered carbocyclic group including a heteroatom such as N, S, P, or O, and having the specified number of carbon atoms. Non-limiting examples of the heterocyclic group are pyrrolidinyl and piperidinyl. At least one hydrogen atom in the heterocyclic group may be substituted with substituents that are the same as those recited above in conjunction with the alkyl group.

As used herein, the term "heterocyclic alkyl" indicates an alkyl group substituted with a heterocyclic group, and having the specified number of carbon atoms. A non-limiting example of the heterocyclic alkyl group includes a (piperidin-2-yl)methyl group (C$_5$H$_9$NCH$_2$).

As used herein, the term "heteroaryloxyalkyl" indicates an alkyl group substituted with a heteroaryloxy group, and having the specified number of carbon atoms. A non-limiting example of the heteroaryloxyalkyl group includes a (pyrid-2-yl)oxymethyl group (C5H4NOCH2).

As used herein, the term "heteroarylalkyloxy" indicates "—O-heteroarylalkyl". A non-limiting example of the heteroarylalkyloxy group includes a (pyrid-2-yl)methyloxy group (C$_5$H$_4$NCH$_2$O).

The term "sulfonyl" indicates R"—SO$_2$—, wherein R" is a hydrogen atom, alkyl, aryl, heteroaryl, aryl-alkyl, heteroarylalkyl, alkoxy, aryloxy, cycloalkyl, or a heterocyclic group.

The term "sulfamoyl" group indicates H$_2$NS(O$_2$)—, alkyl-NHS(O$_2$)—, (alkyl)$_2$NS(O$_2$)-aryl-NHS(O$_2$)—, alkyl-(aryl)-NS(O$_2$)—, (aryl)$_2$NS(O)$_2$, heteroaryl-NHS(O$_2$)—, (aryl-alkyl)-NHS(O$_2$)—, or (heteroaryl-alkyl)-NHS(O$_2$)—.

The term "amino group" indicates a group with a nitrogen atom covalently bonded to at least one carbon or hetero atom. The amino group may refer to, for example, an optionally substituted —NH₂ group.

The term "amino group" also indicates an "alkylamino group" with nitrogen bound to at least one additional alkyl group having the indicated number of carbon atoms, and "arylamino" and "diarylamino" groups with at least one or two nitrogen atoms bound to a selected aryl group having the indicated number of carbon atoms.

As used herein, the term "alkylene" indicates a straight or branched divalent aliphatic hydrocarbon group having the specified number of carbon atoms. Non-limiting examples of the alkylene group include methylene, ethylene, propylene, and butylene.

As used herein, the term "alkenylene" indicates a straight or branched chain, divalent hydrocarbon group having at least one carbon-carbon double bond, and having the specified number of carbon atoms. A non-limiting example of the alkenylene group includes propenylene.

As used herein, the term "alkynylene" indicates to a straight or branched chain, divalent hydrocarbon group having at least one carbon-carbon triple bond, and having the specified number of carbon atoms. A non-limiting example of the alkynylene group includes propynylene.

As used herein, the term "cycloalkylene" refers to a cyclic divalent aliphatic hydrocarbon group having the specified number of carbon atoms. Non-limiting examples of the cycloalkylene group include cyclopropylene, cyclobutylene, cyclopentylene, and cyclohexylene.

One or more embodiments will now be described in more detail with reference to the following examples. However, these examples are for illustrative purposes only and are not intended to limit the scope of the one or more embodiments.

In the following preparation examples, "alt" and "co" in the term "poly(isobutylene-alt-maleic anhydride) and poly{(isobutylene-alt-maleic anhydride)-co-(isobutylene-alt-maleic acid lithium salt)" means an alternating polymer and an copolymer, respectively.

Preparation Example 1

Preparation of poly{(isobutylene-alt-maleic anhydride)-co-(isobutylene-alt-maleic acid lithium salt)} (hereinafter, Li-0.8-PIBMA)-Containing Composition (degree of lithium substitution: 0.8)

4 g of poly(isobutylene-alt-maleic anhydride) represented by Formula 8c below (having a mixing ratio of isobutylene to maleic anhydride=1:1 by mole; and a weight average molecular weight=about 300,000-350,000) and 0.996 g of lithium hydroxide (LiOH) were added to 96 g of deionized water, and then mixed together to obtain a mixture, which was then stirred at about 70° C. for about 24 hours to prepare a polymer composition including a poly{(isobutylene-alt-maleic anhydride)-co-(isobutylene-alt-maleic acid lithium salt)} of Formula 8a below ((hereinafter, polymer of Formula 8a) and deionized water.

An amount of the polymer of Formula 8a was about 5 parts by weight based on 100 parts by weight of the polymer of Formula 8A-containing composition.

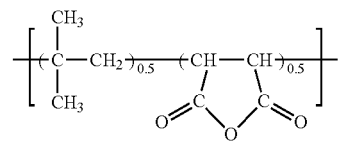

Formula 8c

The polymer composition was filtered to remove a water-insoluble component. Water was removed from a filtered solid product, which was then dried at about 80° C. to obtain a polymer of Formula 8a below.

The polymer of Formula 8a had a degree of lithium substitution of about 0.8, and a weight average molecular weight of about 300,000 to about 350,000.

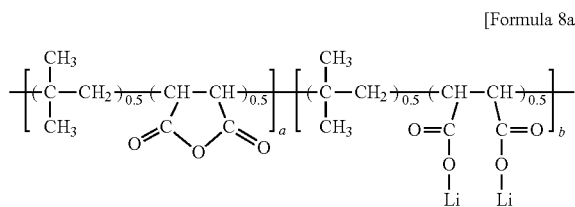

[Formula 8a]

In Formula 8a, a and b, which indicate mole fractions, may be 0.2 and 0.8, respectively Preparation Example 2

Preparation of poly(isobutylene-alt-maleic acid lithium salt) (hereinafter, Li-1.0-PIBMA)-Containing Composition (degree of lithium substitution: 1.0)

A polymer composition including poly(isobutylene-alt-maleic acid lithium salt of Formula 8b (hereinafter, polymer of Formula 8b) and deionized water was prepared in the same manner as in Example 1, except that 1.245 g of LiOH and 96 g of deionized water were used.

In the polymer composition, an amount of the polymer of Formula 8b was about 5 parts by weight based on 100 parts by weight of the polymer of Formula 8b-containing composition The polymer composition was filtered to remove a water-insoluble component. Water was removed from a filtered solid product, which was then dried at about 80° C. to obtain a polymer of Formula 8b below.

The polymer of Formula 8b below had a degree of lithium substitution of about 1.0, and a weight average molecular weight of about 300,000 to about 350,000

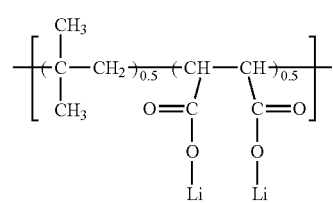

Formula 8B

Preparation Example 3

Preparation of poly{(isobutylene-alt-maleic anhydride)-co-(isobutylene-alt-maleic acid lithium salt)} (hereinafter, Li-0.5-PIBMA)-Containing Composition (degree of lithium substitution: 0.5)

A polymer composition including poly{(isobutylene-alt-maleic anhydride)-co-(isobutylene-alt-maleic acid lithium salt)} of Formula 8a (hereafter, polymer of Formula 8a) and deionized water was prepared in the same manner as in Example 1, except that 0.623 g of LiOH and 96 g of deionized water were used. In the polymer composition, an amount of the polymer of Formula 8a was about 5 parts by weight based on 100 parts by weight of the polymer of Formula 8a-containing composition.

The polymer composition was filtered to remove a water-insoluble component. Water was removed from a filtered solid product, which was then dried at about 80° C. to obtain a polymer of Formula 8a below.

The polymer of Formula 8a below had a degree of lithium substitution of about 1.0, and a weight average molecular weight of about 300,000 to about 350,000.

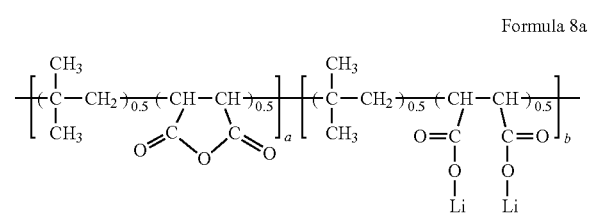

Formula 8a

In Formula 8a, a and b may be each a mole fraction of 0.5.

Preparation Example 4

Preparation of poly{(isobutylene-alt-maleic anhydride)-co-(isobutylene-alt-maleic acid lithium salt)} (hereinafter, Li-0.6-PIBMA)-Containing Composition (degree of lithium substitution: 0.6)

A polymer composition including poly{(isobutylene-alt-maleic anhydride)-co-(isobutylene-alt-maleic acid lithium salt)}(hereafter, polymer of Formula 8a) and deionized water was prepared in the same manner as in Example 1, except that 0.747 g of LiOH and 96 g of deionized water were used. In the polymer composition, n amount of the polymer of Formula 8a was about 5 parts by weight based on 100 parts by weight of the polymer of Formula 8a-containing composition.

The polymer composition was filtered to remove a water-insoluble component. Water was removed from a filtered solid product, which was then dried at about 80° C. to obtain a polymer of Formula 8a below.

The polymer of Formula 8a had a degree of lithium substitution of about 1.0, and a weight average molecular weight of about 300,000 to about 350,000.

Formula 8a

In Formula 8a, a and b, which indicate mole fractions, may be 0.4 and 0.6, respectively.

Preparation Example 5

Preparation of poly{(isobutylene-alt-maleic anhydride)-co-(isobutylene-alt-maleic acid lithium salt)} (hereinafter, Li-0.7-PIBMA)-Containing Composition (degree of lithium substitution: 0.7)

A polymer composition including poly{(isobutylene-alt-maleic anhydride)-co-(isobutylene-alt-maleic acid lithium salt)} of Formula-8a (hereinafter, polymer of Formula 8a) and deionized water was prepared in the same manner as in Example 1, except that 0.873 g of LiOH and 96 g of deionized water were used.

In the polymer composition, an amount of the polymer of Formula 8a was about 5 parts by weight based on 100 parts by weight of the polymer of Formula 8a-containing composition.

The polymer composition was filtered to remove a water-insoluble component. Water was removed from a filtered solid product, which was then dried at about 80° C. to obtain a polymer of Formula 8a below.

The polymer of Formula 8a had a degree of lithium substitution of about 1.0, and a weight average molecular weight of about 300,000 to about 350,000.

Formula 8a

In Formula 8a, a may be a mole fraction of 0.3, and b may be a mole fraction of 0.7.

Preparation Example 6

Preparation of poly{(isobutylene-alt-maleic anhydride)-co-(isobutylene-alt-maleic acid lithium salt)} (hereinafter, Li-0.2-PIBMA)-Containing Composition (degree of lithium substitution: 0.2)

A polymer composition including poly{(isobutylene-alt-maleic anhydride)-co-(isobutylene-alt-maleic acid lithium salt)} of Formula 8A (hereafter, polymer of Formula 8a) and deionized water was prepared in the same manner as in Example 1, except that 0.250 g of LiOH and 96 g of deionized water were used. In the polymer composition, an amount of the polymer of Formula 8a was about 5 parts by weight based on 100 parts by weight of the polymer of Formula 8a-containing composition.

The polymer composition was filtered to remove a water-insoluble component. Water was removed from a filtered solid product, which was then dried at about 80° C. to obtain a polymer of Formula 8a below.

The polymer of Formula 8a had a degree of lithium substitution of about 1.0, and a weight average molecular weight of about 300,000 to about 350,000.

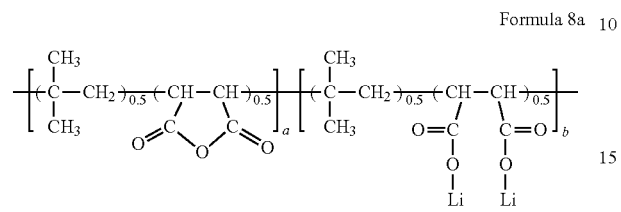

Formula 8a

In Formula 8a, a may be a mole fraction of 0.8, and b may be a mole fraction of 0.2.

Preparation Example 7

Preparation of poly{(isobutylene-alt-maleic anhydride)-co-(isobutylene-alt-maleic acid ammonium salt)} Containing Composition 10 g of poly{(isobutylene-alt-maleic anhydride)-co-(isobutylene-alt-maleic acid ammonium salt)} (having a weight average molecular weight of about 160,000 to 170,000) represented by Formula 9 below (hereinafter, polymer of Formula 9), and 90 g of deionized water were mixed and stirred at room temperature for about 24 hours to obtain a polymer composition including poly{(isobutylene-alt-maleic anhydride)-co-(isobutylene-alt-maleic acid ammonium salt)} (having a weight average molecular weight of about 160,000 to 170,000) represented by Formula 9 below (hereinafter, polymer of Formula 9), and deionized water.

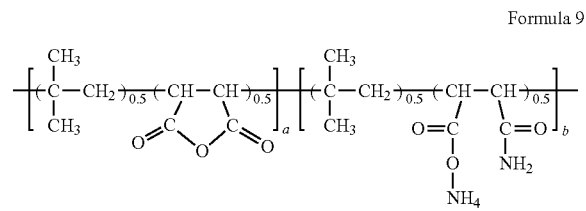

Formula 9

The polymer of Formula 9 had a degree of polymerization from about 1,000 to about 1,200, wherein a in Formula 9 was from 0.1 to 0.9, and b was from 0.1 to 0.9.

An amount of the polymer of Formula 9 in the polymer composition was about 10 parts by weight based on 100 parts by weight of the polymer of Formula 9 containing polymer composition.

Preparation Example 8

Preparation of poly{(ethylene-alt-maleic anhydride)-co-(ethylene-alt-maleic acid lithium salt)} (having a degree of lithium substitution of 0.5) (hereinafter, referred to as Li-0.5-PEMA)-Containing Composition 10 g of poly(ethylene-co-maleic acid anhydride) (having a 1:1 mixed ratio by mole of ethylene to maleic acid anhydride and a weight average molecular weight of 400,000) and 1.9 g of LiOH were mixed in 90 g of deionized water, and then stirred at about 70° C. for about 24 hours to obtain a polymer composition of poly{(ethylene-alt-maleic anhydride)-co-(ethylene-alt-maleic acid lithium salt)} represented by Formula 10 below (hereafter, polymer of Formula 10) in deionized water.

The polymer of Formula 10 in the polymer composition had a degree of lithium substitution of about 0.5. An amount of the polymer of Formula 10 was about 10 parts by weight based on 100 parts by weight of the polymer composition including the polymer of Formula 10.

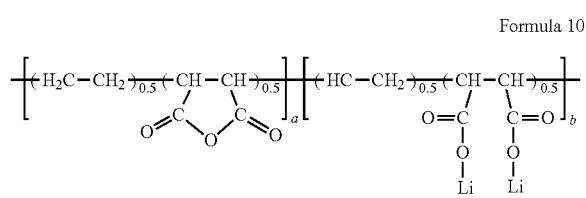

Formula 10

In Formula 10, a and b, which indicate mole fractions, may be both 0.5. The polymer of Formula 10 had a degree of polymerization of about 3,000.

Example 1

Manufacture of Negative Electrode and Coin Half Cell 4.5 g of graphite (SFG6) powder (Available from Timcal Co.) (D90=about 6.5 μm) as a negative electrode active material, and 10 g of the poly{(isobutylene-alt-maleic anhydride)-co-(isobutylene-alt-maleic acid lithium salt)}(degree of lithium substitution: 0.8)-containing composition of Preparation Example 1 as a binder were mixed together in a weight ratio of 90:10 to prepare a slurry.

The slurry was coated on a cupper electric collector using a doctor blade to a thickness of about 50 μm, dried at about 80° C. in an oven for about 2 hours, and then dried further in a vacuum at about 120° C. for about 2 hours, thereby manufacturing a negative electrode.

A coin half cell (CR-2032 standard) was manufactured using the negative electrode, a lithium metal as a counter electrode, a polyethylene separator (Cellgard 3510), and an electrolyte of 1.3M LiPF$_6$ dissolved in a mixed solution of EC (ethylene carbonate) and DEC (diethyl carbonate) in a volume ratio of 3:7.

Example 2

Manufacture of Negative Electrode and Coin Half Cell

A coin half cell was manufactured in the same manner as in Example 1, except that poly(isobutylene-alt-maleic acid lithium salt)-containing composition (degree of lithium substitution: 1.0) of Preparation Example 2, instead of the poly{(isobutylene-alt-maleic anhydride)-co-(isobutylene-alt-maleic acid lithium salt)}-containing composition (degree of lithium substitution: 0.8) of Preparation Example 1, was used as a binder.

Example 3

Manufacture of Negative Electrode and Coin Half Cell 4.4 g of graphite (M1) powder (available from Carbonics Co.) (D50=1 μm) as a negative electrode active material, and 12 g of the poly{(isobutylene-alt-maleic anhydride)-co-(isobutylene-alt-maleic acid lithium salt)}(degree of lithium substitution: 0.5) of Preparation Example 3 as a binder were mixed together in a weight ratio of 88:12 to prepare a slurry.

The slurry was coated on a cupper electric collector using a doctor blade to a thickness of about 50 μm, dried at about 80° C. in an oven for about 2 hours, and then dried further in a vacuum at about 120° C. for about 2 hours, thereby manufacturing a negative electrode.

A coin half cell (CR-2032 standard) was manufactured using the negative electrode, a lithium metal as a counter electrode, a polyethylene separator (Cellgard 3510), and an electrolyte of 1.3 M $LiPF_6$ dissolved in a mixed solution of EC (ethylene carbonate) and DEC (diethyl carbonate) in a volume ratio of 3:7.

Example 4

Manufacture of Negative Electrode and Coin Half Cell

A coin half cell was manufactured in the same manner as in Example 3, except that 12 g of the poly{(isobutylene-alt-maleic anhydride)-co-(isobutylene-alt-maleic acid lithium salt)}-containing composition (degree of lithium substitution: 0.6) of Preparation Example 4, instead of 12 g of the poly{(isobutylene-alt-maleic anhydride)-co-(isobutylene-alt-maleic acid lithium salt)}-containing composition (degree of lithium substitution: 0.5) of Preparation Example 3, was used as a binder.

Example 5

Manufacture of Negative Electrode and Coin Half Cell

A coin half cell was manufactured in the same manner as in Example 3, except that 12 g of the poly{(isobutylene-alt-maleic anhydride)-co-(isobutylene-alt-maleic acid lithium salt)}-containing composition (degree of lithium substitution: 0.7) of Preparation Example 5, instead of 12 g of the poly{(isobutylene-alt-maleic anhydride)-co-(isobutylene-alt-maleic acid lithium salt)}-containing composition (degree of lithium substitution: 0.5) of Preparation Example 3, was used as a binder.

Example 6

Manufacture of Negative Electrode and Coin Half Cell

A coin half cell was manufactured in the same manner as in Example 3, except that 12 g of the poly{(isobutylene-alt-maleic anhydride)-co-(isobutylene-alt-maleic acid lithium salt)}-containing composition (degree of lithium substitution: 0.8) of Preparation Example 1, instead of 12 g of the poly{(isobutylene-alt-maleic anhydride)-co-(isobutylene-alt-maleic acid lithium salt)}-containing composition (degree of lithium substitution: 0.5) of Preparation Example 3, was used as a binder.

Example 7

Manufacture of Negative Electrode and Half Cell

A coin half cell was manufactured in the same manner as in Example 3, except that 12 g of poly{(isobutylene-alt-maleic anhydride)-co-(isobutylene-alt-maleic acid lithium salt)}-containing composition (degree of lithium substitution: 1.0) of Preparation Example 2, instead of 12 g of poly{(isobutylene-alt-maleic anhydride)-co-(isobutylene-alt-maleic acid lithium salt)}-containing composition (degree of lithium substitution: 0.5) of Preparation Example 3, was used as a binder.

Example 8

Manufacture of Negative Electrode and Half Cell 4 g of silicon/carbon nanotube ("CNT") composite as a negative electrode active material and 20 g of the lithium-substituted poly(isobutylene-alt-maleic acid lithium salt)-containing composition (degree of lithium substitution: 1.0) of Preparation Example 2 as a binder were mixed together in a weight ratio of 80:20 to prepare a slurry.

The slurry was coated on a cupper electric collector using a doctor blade to a thickness of about 50 μm, dried at about 80° C. in an oven for about 2 hours, and then dried further in a vacuum at about 120° C. for about 2 hours, thereby manufacturing a negative electrode plate.

A coin half cell (CR-2032 standard) was manufactured using the negative electrode, a lithium metal as a counter electrode, a polyethylene separator (Cellgard 3510), and an electrolyte of 1.3 M $LiPF_6$ dissolved in a mixed solution of EC (ethylene carbonate), DEC (diethyl carbonate) and FEC (fluoroethylene carbonate) in a volume ratio of 2:6:2.

Example 9

Manufacture of Negative Electrode and Half Cell 3.5 g of manganese oxide ($MnO_x$, 0<x≤2) as a negative electrode active material, 0.75 g of a carbon conducting agent (Super-P, available from Timcal Inc.), and 15 g of the poly{(isobutylene-alt-maleic anhydride)-co-(isobutylene-alt-maleic acid lithium salt)}-containing composition (degree of lithium substitution: 0.8) of Preparation Example 1 were mixed together in a weight ratio of 70:15:15 to prepare a slurry.

The slurry was coated on a cupper electric collector using a doctor blade to a thickness of about 50 μm, dried at about 80° C. in an oven for about 2 hours, and then dried further in a vacuum at about 120° C. for about 2 hours, thereby manufacturing a negative electrode plate.

A coin half cell (CR-2032 standard) was manufactured using the negative electrode, a lithium metal as a counter electrode, a polyethylene separator (Cellgard 3510), and an electrolyte of 1.3 M $LiPF_6$ dissolved in a mixed solution of EC (ethylene carbonate), DEC (diethyl carbonate) and FEC (fluoroethylene carbonate) in a volume ratio of 2:6:2.

Example 10

Manufacture of Negative Electrode and Half Cell

A coin half cell was manufactured in the same manner as in Example 9, except that 15 g of the lithium-substituted poly(isobutylene-alt-maleic acid lithium salt)-containing composition (degree of lithium substitution: 1.0) of Preparation Example 2, instead of 12 g of the poly{(isobutylene-alt-maleic anhydride)-co-(isobutylene-alt-maleic acid lithium salt)}-containing composition (degree of lithium substitution: 0.8) of Preparation Example 1, was used as a binder.

Example 11

Manufacture of Negative Electrode and Coin Half Cell 4.4 g of graphite (M1)(D50=1 μm) powder (available from Carbonics) as a negative electrode active material and 6 g of the poly{(isobutylene-alt-maleic anhydride)-co-(isobutylene-alt-maleic acid ammonium salt)} containing polymer composition of Preparation Example 7 as a binder were mixed to prepare a slurry. A mixed ratio by weight of the solid components in the slurry, i.e., the negative active material to the poly{(isobutylene-alt-maleic anhydride)-co-(isobutylene-alt-maleic acid ammonium salt)} as binder was about 88:12.

The slurry was coated on a Cu current collector to a thickness of about 50 μm using a doctor blade. Then, the resultant was dried in an oven at about 80° C. for 2 hours, and then dried again at about 120□ in a vacuum for 2 hours to manufacture a negative electrode plate.

The negative electrode plate, a lithium metal as a counter electrode, a polypropylene layer (Celgard 3510) as a separator, and an electrolyte solution obtained by dissolving 1.3 M of LiPF6 in a mixed solvent of ethylene carbonate (EC) and diethylene carbonate (DEC) (volume ratio of 3:7) were used to manufacture a CR-2032 standard coin half cell.

Example 12

Manufacture of Negative Electrode and Coin Half Cell 4.4 g of graphite (M1)(D50=about 1 μm) powder (available from Carbonics) as a negative electrode active material and 6 g of the poly{(ethylene-alt-maleic anhydride)-co-(ethylene-alt-maleic acid lithium salt)}-containing polymer composition (having a degree of lithium substitution of 0.5) of Preparation Example 8 as a binder were mixed to prepare a slurry. A mixed ratio by weight of the solid components in the slurry, i.e., the negative active material to the poly{(ethylene-alt-maleic anhydride)-co-(ethylene-alt-maleic acid lithium salt)} as binder was about 88:12.

The slurry was coated on a Cu current collector to a thickness of about 50 μm using a doctor blade. Then, the resultant was dried in an oven at about 80° C. for 2 hours, and then dried again at about 120□ in a vacuum for 2 hours to manufacture a negative electrode plate.

The negative electrode plate, a lithium metal as a counter electrode, a polypropylene layer (Celgard 3510) as a separator, and an electrolyte solution obtained by dissolving 1.3 M of LiPF6 in a mixed solvent of ethylene carbonate (EC) and diethylene carbonate (DEC) (volume ratio of 3:7) were used to manufacture a CR-2032 standard coin half cell.

Example 13

Manufacture of Negative Electrode and Coin Half Cell 4.5 g of graphite (SFG6) (D90=about 6.5 μm) powder (available from TIMICAL Ltd.) as a negative electrode active material and 5 g of the poly{(isobutylene-alt-maleic anhydride)-co-(isobutylene-alt-maleic acid ammonium salt)} containing polymer composition of Preparation Example 7 as a binder were mixed to prepare a slurry. A mixed ratio by weight of the solid components in the slurry, i.e., the negative active material to the poly{(isobutylene-alt-maleic anhydride)-co-(isobutylene-alt-maleic acid ammonium salt)} as binder was about 90:10.

The slurry was coated on a Cu current collector to a thickness of about 50 μm using a doctor blade. Then, the resultant was dried in an oven at about 80° C. for 2 hours, and then dried again at about 120□ in a vacuum for 2 hours to manufacture a negative electrode plate.

The negative electrode plate, a lithium metal as a counter electrode, a polypropylene layer (Celgard 3510) as a separator, and an electrolyte solution obtained by dissolving 1.3 M of LiPF6 in a mixed solvent of ethylene carbonate (EC) and diethylene carbonate (DEC) (volume ratio of 3:7) were used to manufacture a CR-2032 standard coin half cell.

Example 14

Manufacture of Negative Electrode and Coin Half Cell 4.5 g of graphite (SFG6) (D90=about 6.5 μm) powder (available from TIMICAL Ltd.) as a negative electrode active material and 5 g of the poly{(ethylene-alt-maleic anhydride)-co-(ethylene-alt-maleic acid lithium salt)}-containing polymer composition (having a degree of lithium substitution of 0.5) of Preparation Example 8 as a binder were mixed to prepare a slurry. A mixed ratio by weight of the solid components in the slurry, i.e., the negative active material to the poly{(ethylene-alt-maleic anhydride)-co-(ethylene-alt-maleic acid lithium salt)} as binder was about 90:10.

The slurry was coated on a Cu current collector to a thickness of about 50 μm using a doctor blade. Then, the resultant was dried in an oven at about 80° C. for 2 hours, and then dried again at about 120□ in a vacuum for 2 hours to manufacture a negative electrode plate.

The negative electrode plate, a lithium metal as a counter electrode, a polypropylene layer (Celgard 3510) as a separator, and an electrolyte solution obtained by dissolving 1.3 M of LiPF6 in a mixed solvent of ethylene carbonate (EC) and diethylene carbonate (DEC) (volume ratio of 3:7) were used to manufacture a CR-2032 standard coin half cell.

Comparative Example 1

Manufacture of Negative Electrode and Half Cell

A negative electrode and a coin half cell were manufactured in the same manner as in Example 1, except that 8.33 g of a 6 percent by weight ("wt %") polyvinylidene fluoride binder solution (solvent; N-methylpyrrolidone ("NMP")), instead of the poly{(isobutylene-alt-maleic anhydride)-co-(isobutylene-alt-maleic acid lithium salt)}-containing composition (degree of lithium substitution: 0.8) of Preparation Example 1, was used as a binder.

Comparative Example 2

Manufacture of Negative Electrode and Half Cell

A negative electrode and a coin half cell were manufactured in the same manner as in Comparative Example 1, except that 8.33 g of a 6 wt % binder solution of poly(isobutylene-alt-maleic anhydride)isobutylene and maleic anhydride (in a mixed ratio of 1:1 by mole) (solvent; N-methylpyrrolidone ("NMP"); and a weight average molecular weight of about 300,000 to 350,000), instead of polyvinylidene fluoride, was used.

Comparative Example 3

Manufacture of Negative Electrode and Half Cell

A negative electrode and a coin half cell were manufactured in the same manner as in Example 3, except that 10 g of a 6 wt % polyvinylidene fluoride binder solution (N-methylpyrrolidone ("NMP") solvent), instead of poly{(isobutylene-alt-maleic anhydride)-co-(isobutylene-alt-maleic acid lithium salt)}-containing composition (degree of lithium substitution: 0.5) of Preparation Example 3, was used.

Comparative Example 4

Manufacture of Negative Electrode and Half Cell

A negative electrode and a coin half cell were manufactured in the same manner as in Example 3, except that 10 g of a 6 wt % poly(isobutylene-alt-maleic anhydride) binder solution (a 1:1 mixed ratio by mole of isobutylene to maleic anhydride; weight average molecular weight of about 300,000 to 350,000; and N-methylpyrrolidone ("NMP") solvent), instead of polyvinylidene fluoride binder solution, was used.

Comparative Example 5

Manufacture of Negative Electrode and Half Cell

A negative electrode and a coin half cell were manufactured in the same manner as in Example 8, except that 20 g of a 5 wt % polyamideimide binder solution (N-methylpyrrolidone ("NMP") solvent), instead of the poly(isobutylene-alt-maleic acid lithium salt)-containing composition (degree of lithium substitution: 1.0) of Preparation Example 2, was used.

Comparative Example 6

Manufacture of Negative Electrode and Half Cell

A negative electrode and a coin half cell were manufactured in the same manner as in Comparative Example 5, except that 16.7 g of a 6 wt % poly(isobutylene-alt-maleic anhydride) ("PIBMA") binder solution (a 1:1 mixed ratio by mole of isobutylene to maleic anhydride; weight average molecular weight of about 300,000 to 350,000; and N-methylpyrrolidone ("NMP") solvent), instead of polyamideimide, was used.

Comparative Example 7

Manufacture of Negative Electrode and Half Cell

A negative electrode and a coin half cell were manufactured in the same manner as in Example 9, except that 15 g of a 5 wt % polyamideimide ("PAI") binder solution (N-methylpyrrolidone ("NMP") solvent), instead of the poly{(isobutylene-alt-maleic anhydride)-co-(isobutylene-alt-maleic acid lithium salt)}-)-containing composition (degree of lithium substitution: 0.8) of Preparation Example 1, substitution: 0.8) of Preparation Example 1, was used.

Comparative Example 8

Manufacture of Negative Electrode and Half Cell

A negative electrode and a coin half cell were manufactured in the same manner as in Comparative Example 7, except that 12.5 g of a 6 wt % the poly{(isobutylene-alt-maleic anhydride)-co-(isobutylene-alt-maleic acid lithium salt)}(degree of lithium substitution: 0.8) of Preparation Example 1 containing binder solution (solvent: N-methylpyrrolidone (NMP)) of Preparation Example 1, instead of polyamide imide binder solution, was used.

Evaluation Example 1

$^1$H-NMR Analysis

The poly{(isobutylene-alt-maleic anhydride)-co-(isobutylene-alt-maleic acid lithium salt)}-containing compositions of Preparation Examples 1, 3 to 6 and the poly{(isobutylene-alt-maleic lithium salt)}containing compositions of Preparation Example 2 were analyzed by $^1$H-nuclear magnetic resonance ("NMR") spectroscopy through a sample preparation as described below. The results are shown in FIGS. 2 to 6.

For the NMR spectroscopy, the poly{(isobutylene-alt-maleic anhydride)-co-(isobutylene-alt-maleic acid lithium salt)} and the poly{(isobutylene-alt-maleic lithium salt)} was extracted from each of the compositions of Preparation Examples 1 to 6 by filtering the composition, and then removing insoluble moieties.

The structure of the (isobutylene-alt-maleic lithium salt) unit was determined to be of the following formula:

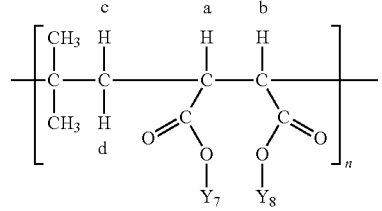

In the formula above, at least one of $Y_7$ and $Y_8$ is lithium, and the rest of $Y_7$ and $Y_8$ is a hydrogen atom, and n, which is a degree of polymerization, was about 1,945 to 2,270. Although a mixed ratio of each repeating unit was not represented, a mole fraction of an isobutylene repeating unit was about 0.5, and a mole fraction of a maleic anhydride repeating unit was about 0.5.

In the formula above, protons in different magnetic environments are denoted by a, b, c, and d to distinguish one from another.

Figure 2:
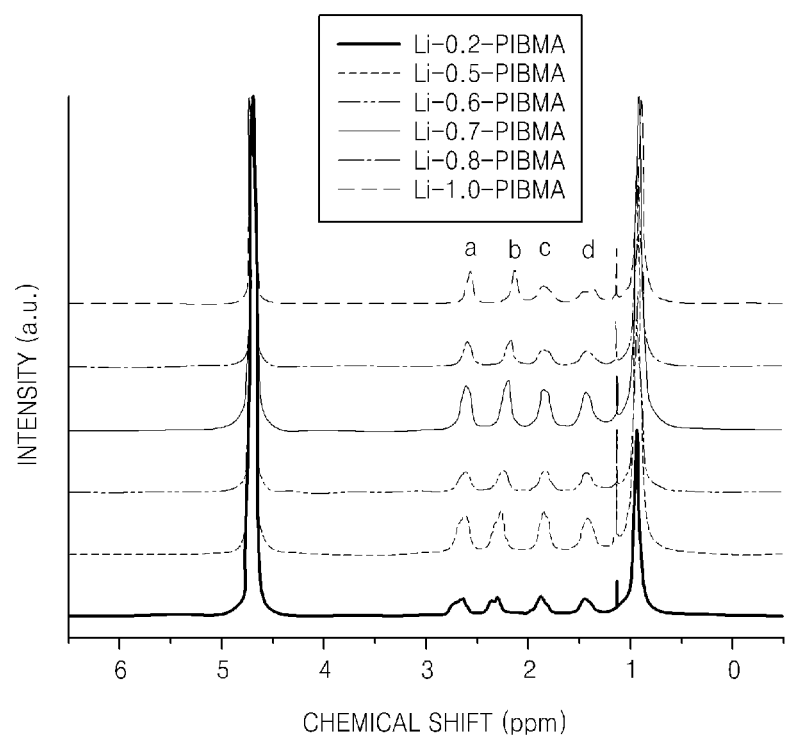
FIGS. 2-4 are graphs of intensity (arbitrary units, a.u.) versus chemical shift (part per million, ppm) illustrating $^1$H-nuclear magnetic resonance ("NMR") spectra of polymers prepared according to Preparation Examples 1 to 6.
Figure 3:
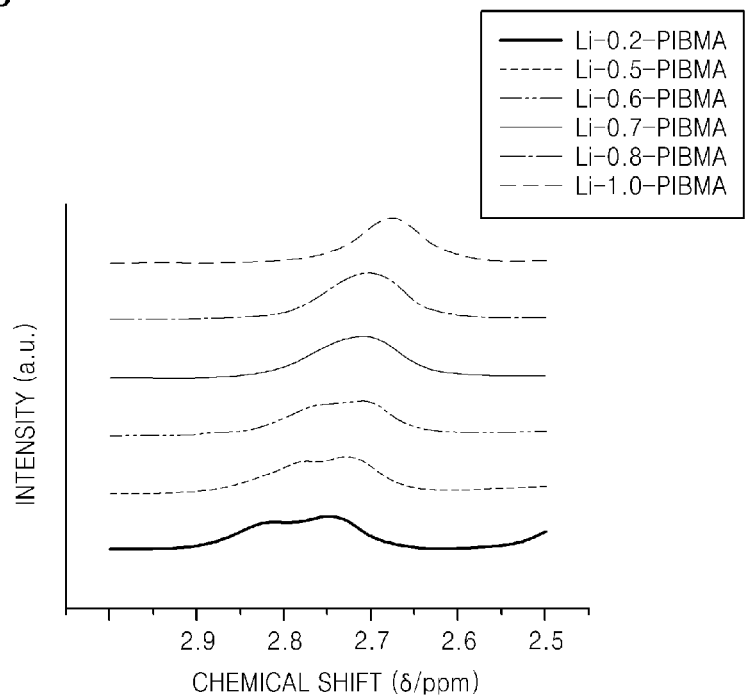
Figure 4:
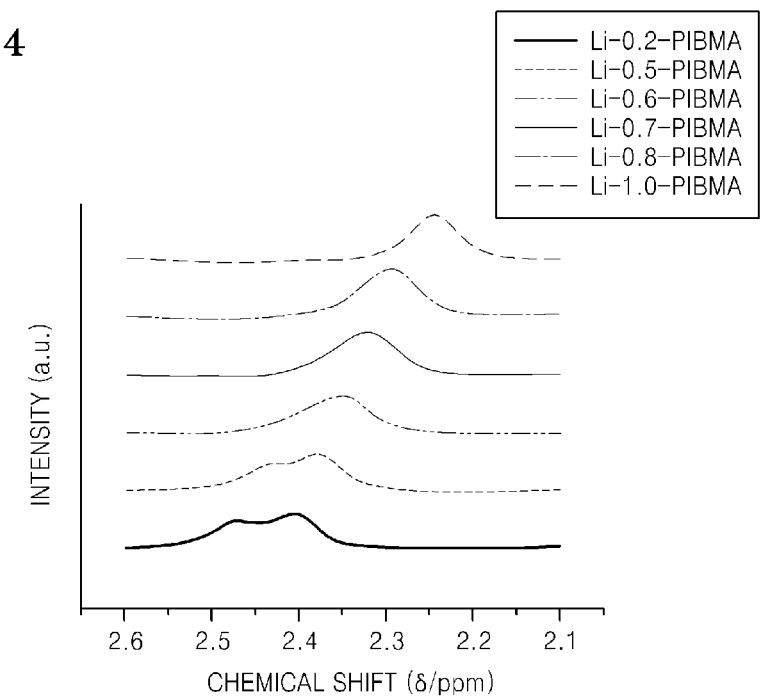

FIGS. 2 to 4 are NMR spectra of the lithium-substituted poly(isobutylene-alt-maleic anhydride exhibiting proton peaks corresponding to the protons a, b, c, and d. In FIGS. 2 to 4, a, b, c, and d are proton peaks corresponding to the protons a, b, c, and d, respectively.

Each of the poly{(isobutylene-alt-maleic anhydride)-co-(isobutylene-alt-maleic acid lithium salt)}-containing compositions of Preparation Examples 1, 3 to 6 and the poly{(isobutylene-alt-maleic lithium salt)}containing compositions of Preparation Example 2 was filtered and then water-insoluble moiety were removed to obtain a filtered solid component. Water was removed from the filtered solid component to obtain poly{(isobutylene-alt-maleic anhydride)-co-(isobutylene-alt-maleic acid lithium salt)} and the poly{(isobutylene-alt-maleic lithium salt)}.

Each of the poly{(isobutylene-alt-maleic anhydride)-co-(isobutylene-alt-maleic acid lithium salt)} and the poly{(isobutylene-alt-maleic lithium salt)} was dissolved in $D_2O$ to prepare a sample for $^1H$-NMR spectroscopy, which was conducted using an NMR Spectrometer (300 MHz, DPX300, available from Bruker Co.)

Referring to FIG. 1, with the substitution of hydrogen in —COOH group of the maleic anhydride repeating unit by lithium, a chemical shift of proton a or proton b occurred depending on the position of proton a or proton b bound to the polymer backbone. The higher the degree of lithium substitution, a chemical shift of proton a was directed more downward from 2.75 ppm or less, and a chemical shift of proton b was directed more downward from 2.4 ppm or less.

FIGS. 3 and 4 are magnified views from the centers of peaks a and b in the NMR spectra.

Referring to FIGS. 3 and 4, it is more clear that chemical shifts of peak a and peak b vary depending on the degree of substitution of lithium ions.

Figure 5:
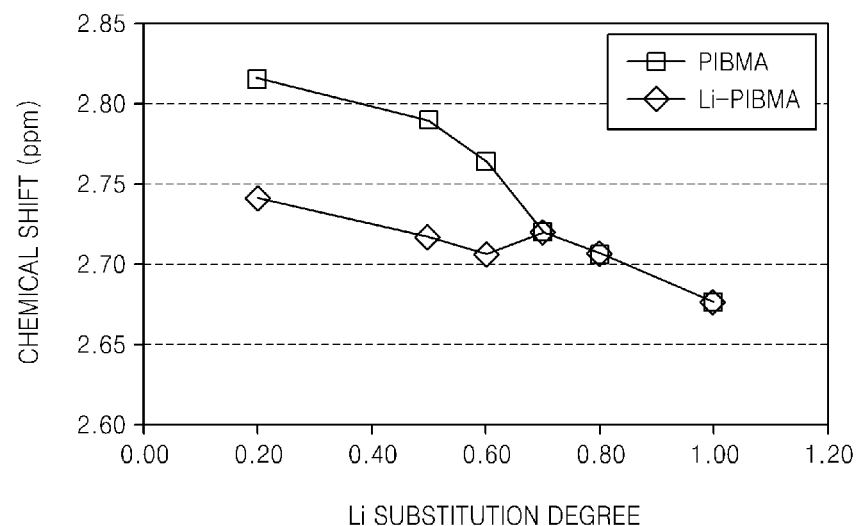
FIGS. 5-6 are graphs of chemical shift (part per million, ppm) versus lithium substitution degree illustrating the results of $^1$H-nuclear magnetic resonance ("NMR") spectra of polymers prepared according to Preparation Examples 1 to 6.
Figure 6:
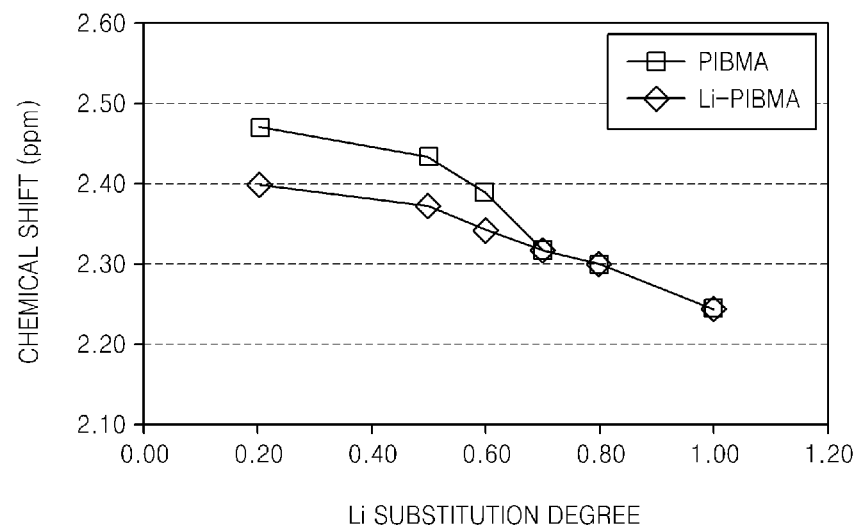

FIGS. 5 and 6 illustrates chemical shifts of peak a and peak b in the poly{(isobutylene-alt-maleic anhydride)-co-(isobutylene-alt-maleic acid lithium salt)}-containing compositions of Preparation Examples 1, 3 to 6 and the poly{(isobutylene-alt-maleic lithium salt)}containing compositions of Preparation Example 2 with respect to the degree of lithium substitution in poly(isobutylene-alt-maleic anhydride) ("PIBMA") and poly{(isobutylene-alt-maleic anhydride)-co-(isobutylene-alt-maleic acid lithium salt b and the poly{(isobutylene-alt-maleic lithium salt)} ("Li-PIBMA").

Evaluation Example 2

ICP-AES Analysis

Water was removed from each of poly{(isobutylene-alt-maleic anhydride)-co-(isobutylene-alt-maleic acid lithium salt)}-containing compositions of Preparation Examples 1, 3 to 6 and the poly{(isobutylene-alt-maleic lithium salt)}containing compositions of Preparation Example 2 to obtain poly{(isobutylene-alt-maleic anhydride)-co-(isobutylene-alt-maleic acid lithium salt)} and the poly{(isobutylene-alt-maleic lithium salt)} in solid form, which was then analyzed by inductively coupled plasma atomic emission spectrometry (ICP-AES). The results are shown in Table 1 below. A Shimadzu ICP 8100 analyzer was used in ICP-AES.

TABLE 1

| Example | Binder | Li Content |
| --- | --- | --- |
| Preparation Example 1 | Li-0.8-PIBMA | 4.30 wt. % |
| Preparation Example 2 | Li-1.0-PIBMA | 5.50 wt. % |
| Preparation Example 3 | Li-0.5-PIBMA | 3.00 wt. % |
| Preparation Example 4 | Li-0.6-PIBMA | 3.10 wt. % |
| Preparation Example 5 | Li-0.7-PIBMA | 3.80 wt. % |

Evaluation Example 2

Evaluation of Charge-Discharge Characteristics

Charge-discharge characteristics were evaluated as follows. The initial efficiency was calculated using Equation 1 below.

Initial efficiency (%)=(Discharge capacity/Charge capacity)×100    Equation 1

1) Use of Graphite (SFG6) as Negative Active Material

Each of the haft coin cells of Examples 1 and 2 and Comparative Examples 1 and 2 was charged at a constant current of 30 milliAmperes ("mA") per 1 g of the active material to a voltage of 0.001 Volts ("V") (with respect to Li), and then charged at a constant voltage to 15 milliAmperes per gram ("mA/g"), followed by discharging at the same constant current to a voltage of 1.0 V (with respect to Li).

First cycle discharge capacities and initial efficiencies of the half coin cells of Examples 1 and 2 and Comparative Examples 1 and 2 are shown in Table 1 below.

TABLE 2

| Example | Binder | Capacity (mAh/g) | Initial efficiency (%) |
| --- | --- | --- | --- |
| Example 1 | Li-0.8-PIBMA | 333 | 84.3 |
| Example 2 | Li-1.0-PIBMA | 333 | 83.8 |
| Comparative Example 1 | PVDF | 329 | 78.2 |
| Comparative Example 2 | PIBMA | 335 | 80.9 |

Referring to Table 2, the coin half cells of Examples 1 and 2 were found to have improved initial efficiencies, as compared with the half coin cells of Comparative Examples 1 and 2, due to suppressed side reactions between the negative active material and the electrolytic solution.

2) Use of Graphite (M1) as Negative Active Material

Charge-discharge characteristics of the coin half cells of Examples 3 to 7 and Comparative Examples 3 and 4 were evaluated in the same manner as those of the coin half cells of Examples 1 and 2 and Comparative Examples 1 and 2.

First cycle discharge capacities and initial efficiencies of the half coin cells of Examples 3 to 7 and Comparative Examples 3 and 4 are shown in Table 3 below.

TABLE 3

| Example | Binder | Capacity (mAh/g) | Initial efficiency (%) |
| --- | --- | --- | --- |
| Comparative Example 3 | PVDF | 316 | 67.7 |
| Comparative Example 4 | PIBMA | 327 | 70.5 |
| Example 3 | Li-0.5-PIBMA | 317 | 78.0 |
| Example 4 | Li-0.6-PIBMA | 318 | 76.0 |
| Example 5 | Li-0.7-PIBMA | 324 | 79.1 |
| Example 6 | Li-0.8-PIBMA | 325 | 77.6 |
| Example 7 | Li-1.0-PIBMA | 330 | 77.4 |

Referring to Table 3, the coin half cells of Examples 3 to 7 were found to have improved initial efficiencies, as compared with the half coin cells of Comparative Examples 3 and 4, due to suppressed side reactions between the negative active material and the electrolytic solution.

3) Use of Si/CNT Composite as Negative Active Material

Charge-discharge characteristics of the coin half cells of Example 8 and

Comparative Examples 5 and 6 were evaluated in the same manner as those of the coin half cells of Examples 1 and 2 and Comparative Examples 1 and 2. The results are shown in Table 4 below.

First cycle discharge capacities and initial efficiencies of the half coin cells of Example 8 and Comparative Examples 5 and 6 are shown in Table 4.

TABLE 4

| Example | Binder | Capacity (mAh/g) | Initial efficiency (%) |
|---|---|---|---|
| Comparative Example 5 | PAI | 1,170 | 61.8 |
| Comparative Example 6 | PIBMA | 1,030 | 62.2 |
| Example 8 | Li-1.0-PIBMA | 1,180 | 72.2% |

4) Use of $MnO_x$ as Negative Active Material

Charge-discharge characteristics of the coin half cells of Examples 9 and 10 and Comparative Examples 7 and 8 were evaluated in the same manner as those of the coin half cells of Examples 1 and 2 and Comparative Examples 1 and 2. The results are shown in Table 5 below.

First cycle discharge capacities and initial efficiencies of the half coin cells of Examples 9 and 10 and Comparative Examples 7 and 8 are shown in Table 5.

TABLE 5

| Example | Binder | Capacity (mAh/g) | Initial efficiency (%) |
|---|---|---|---|
| Comparative Example | PAI | 973 | 71.1 |
| Comparative Example | PIBMA | 637 | 51.2 |
| Example 9 | Li-0.8-PIBMA | 914 | 75.9 |
| Example 10 | Li-1.0-PIBMA | 925 | 76.9 |

Referring to Table 5, the coin half cells of Examples 9 and 10 were found to have improved initial efficiencies, as compared with the half coin cells of Comparative Examples 7 and 8, due to suppressed side reactions between the negative active material and the electrolyte.

Evaluation Example 4

Evaluation of Charge-Discharge Characteristics

Charge-discharge characteristics were evaluated as follows. The initial efficiency was calculated using Equation 1 below.

Initial efficiency (%)=(Discharge Capacity/Charge Capacity)×100    Equation 1

1) Half Coin Cells of Examples 11-12 and Comparative Example 1

Each of the half coin cells of Examples 11 and 12 and Comparative Example 1 was charged at a constant current of 30 mA per 1 g of the active material to a voltage of 0.001V (with respect to Li), and then charged at the same constant voltage to about 15 mA/g, followed by discharging at the same constant current to a voltage of 1.0V (with respect to lithium). First cycle discharge capacities of the half coin cells of Examples 11 and 12 and Comparative Example 1 are shown in Table 6.

TABLE 6

| Example | Binder | Reversible Capacity (mAh/g) | Initial Efficiency (%) |
|---|---|---|---|
| Comparative Example 1 | PVDF | 316 | 67.7 |
| Example 11 | NH$_4$-PIBMA | 354 | 73.2 |
| Example 12 | Li-0.5-PEMA | 312 | 80.0 |

Referring to Table 6, the half coin cells of Examples 1 and 2 were found to have improved initial efficiencies, as compared with the half coin cell of Comparative Example 1.

2) Coin Half Cells of Examples 13-14 and Comparative Example 2

Each of the half coin cells of Examples 13 and 14 and Comparative Example 2 was charged at a constant current of 30 mA per 1 g of the active material to a voltage of about 0.001V (with respect to Li), and then charged at the same constant voltage to 15 mA/g, followed by discharging at the same constant current to a voltage of 1.0V (with respect to lithium). First cycle discharge capacities of the half coin cells of Examples 13 and 14 and Comparative Example 2 are shown in Table 7.

TABLE 7

| Example | Binder | Reversible Capacity (mAh/g) | Initial Efficiency (%) |
|---|---|---|---|
| Comparative Example 2 | PVDF | 329 | 78.2 |
| Example 13 | NH$_4$-PIBMA | 360 | 78.6 |
| Example 14 | Li-0.5-PEMA | 345 | 82.5 |

Referring to Table 7, the coin half cells of Examples 13 and 14 were found to have improved initial efficiencies and improved reversible capacities, as compared with the coin half cell of Comparative Example 2.

As described above, according to the one or more of the above embodiments of the present inventive concept, a polymer including a first repeating unit represented by Formula 1 above) may form an organic pre-solid electrolyte interface ("PRE-SEI") film on a surface of an electrode active material to cover defects of the electrode active material and block direct contact between the electrode active material and the electrolytic solution, thus suppressing side reactions and consequently improving the initial efficiency of the lithium battery.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A polymer binder for lithium battery comprising
a first repeating unit represented by Formula 1,
a second repeating unit selected from a divalent aliphatic organic group repeating unit and a divalent alicyclic organic group repeating unit, and
a third repeating unit represented by Formula 4a or Formula 4b:

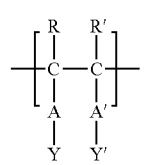

Formula 1 wherein, in Formula 1,
R and R' are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group;

A and A' are each independently —C(=O)O—, —C(=O)—, —OS(=O)$_2$O—, —S(=O)$_2$O—, —S(=O)O—, —OP(=O)O$_2$—, or —P(=O)O$_2$—; and Y and Y' are each independently a hydrogen atom, an alkali metal, an ammonium group, or —NH$_2$, provided that Y and Y' are not simultaneously hydrogen atoms or —NH$_2$,

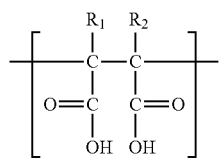

Formula 4a

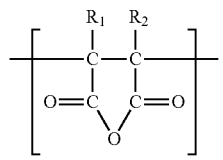

Formula 4b wherein, in Formulae 4a and 4b,

R$_1$ and R$_2$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group.

2. The polymer binder of claim 1, wherein the first repeating unit is represented by Formula 2 or Formula 2a:

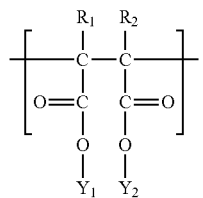

Formula 2

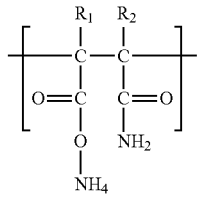

Formula 2a wherein, in Formulae 2 and 2a,

R$_1$ and R$_2$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group; and Y$_1$ and Y$_2$ are each independently a hydrogen atom, an alkali metal, an ammonium group, or —NH$_2$, provided that Y$_1$ and Y$_2$ are not simultaneously hydrogen atoms or —NH$_2$.

3. The polymer binder of claim 1, wherein
the divalent aliphatic organic group repeating unit is a substituted or unsubstituted C1-C30 alkylene group or a substituted or unsubstituted C2-C30 alkynylene group; and
the divalent alicyclic organic group repeating unit is a substituted or unsubstituted C3-C30 cycloalkylene group.

4. The polymer binder of claim 1, wherein the polymer further comprises a second repeating unit represented by Formula 3:

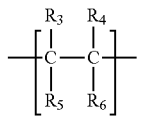

Formula 3 wherein, in Formula 3,

R$_3$ to R$_6$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, a substituted or unsubstituted C3-C30 heterocyclic alkyl group, or $R_3$ and $R_4$, or $R_5$ and $R_6$ are independently linked together to form a ring, wherein the ring is a C6-C10 cycloalkyl group, a C3-C10 heteroaryl group, a fused C3-C10 heteroaryl group, a C3-C10 heterocyclic group, or a fused C3-C10 heterocyclic group.

5. The polymer binder of claim 1, wherein the alkali metal is Li, Na, or K, and the ammonium group is $NH_4$.

6. The polymer binder of claim 1, wherein the polymer comprises a first repeating unit represented by Formula 4 or 4g, a second repeating unit represented by Formula 5, and a third repeating unit represented by Formula 4a or 4b:

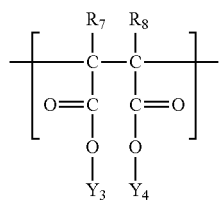

Formula 4

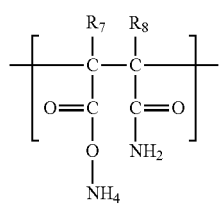

Formula 4g wherein, in Formulae 4 and 4g, $R_7$ and $R_8$ are each independently a hydrogen atom, or a C1-C10 alkyl group; and $Y_3$ and $Y_4$ are each independently a hydrogen atom, Li, Na, K, or $NH_4$, provided that $Y_3$ and $Y_4$ are not simultaneously hydrogen atoms,

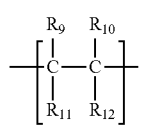

Formula 5 wherein, in Formula 5, $R_9$ to $R_{12}$ are each independently a hydrogen atom or a C1-C10 alkyl group, and

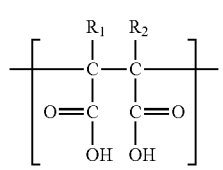

Formula 4a

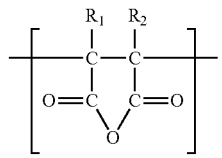

Formula 4b wherein, in Formulae 4a and 4b $R_1$ and $R_2$ are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group.

7. The polymer binder of claim 1, wherein the polymer comprises a first repeating unit represented by Formula 6 or 6a, a second repeating unit represented by Formula 7, and a third repeating unit represented by Formula 4e or 4h:

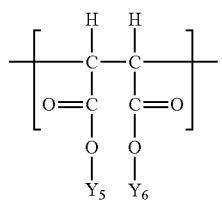

Formula 6

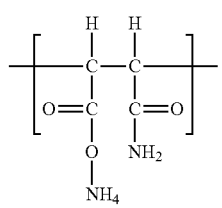

Formula 6a wherein, in Formulae 6 and 6a, $Y_5$ and $Y_6$ are each independently a hydrogen atom, Li, Na, K, or $NH_4$, provided that $Y_5$ and $Y_6$ are not simultaneously hydrogen atoms or $-NH_2$;

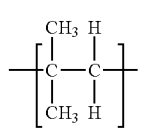

Formula 7

-continued

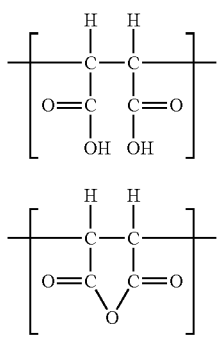

Formula 4e

Formula 4h wherein, the polymer has a degree of polymerization of from about 100 to about 50,000.

8. The polymer binder of claim 1, wherein the polymer is represented by Formula 8 or 8z:

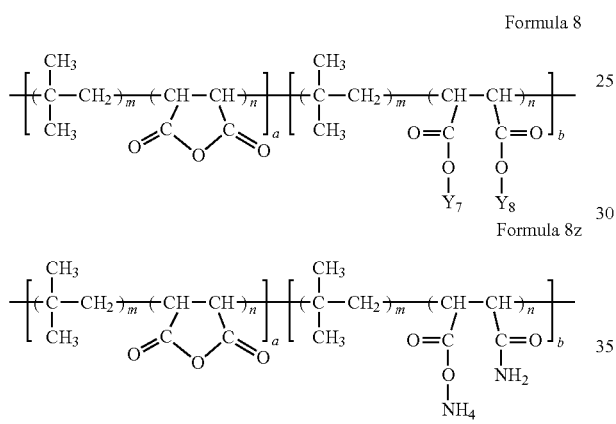

Formula 8

Formula 8z wherein, in Formulae 8 and 8z,
i) $Y_7$ and $Y_8$ are both lithium, or ii) one of $Y_7$ and $Y_8$ is lithium, and the rest is a hydrogen atom,
a is a mole fraction of 0 or from 0.01 to 0.99, b is a mole fraction of 1 or from 0.01 to 0.99, and a+b=1,
m and n are each a mole fraction from 0.01 to 0.99, and m+n=1.

9. The polymer binder of claim 1, wherein, in Formulae 8 and 8z, a is 0, b is 1, and $Y_7$ and $Y_8$ are both lithium.

10. The polymer binder of claim 1, wherein a substitution degree of the polymer with the alkali metal or ammonium group is from about 0.2 to about 1.0.

11. The polymer binder of claim 1, wherein the polymer exhibits two proton peaks from at least one of maleic anhydride and maleic acid in a polymer chain in a chemical shift range of from 2.65 part per million to 2.75 part per million and from 2.2 part per million to 2.4 part per million in a $^1$H nuclear magnetic resonance spectrum.

12. The polymer binder of claim 1, wherein the polymer has a weight average molecular weight of from about 50,000 to about 500,000.

13. The polymer binder of claim 1, wherein a lithium content in the polymer is from about 2 wt % to about 15 wt %.

14. An electrode for a lithium battery, comprising:
a polymer comprising a first repeating unit represented by Formula 1, a second repeating unit selected from a divalent aliphatic organic group repeating unit and a divalent alicyclic organic group repeating unit, and a third repeating unit represented by Formula 4a or Formula 4b; and an electrode active material,

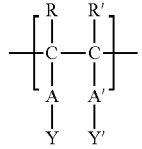

Formula 1 wherein, in Formula 1,
R and R' are each independently a hydrogen atom, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group;
A and A' are each independently —C(=O)O—, —C(=O)—, —OS(=O)$_2$O—, —S(=O)$_2$O—, —S(=O)O—, —OP(=O)O$_2$—, or —P(=O)O$_2$—; and
Y and Y' are each independently a hydrogen atom, an alkali metal, an ammonium group, or —NH$_2$, provided that Y and Y' are not simultaneously hydrogen atoms or —NH$_2$;

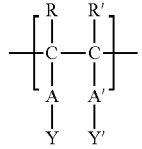

Formula 4a

Formula 4b wherein, in Formulae 4a and 4b,
R$_1$ and R are each independently a hydrogen atom a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclic alkyl group, a substituted or unsubstituted C2-C30 heterocyclic group, or a substituted or unsubstituted C3-C30 heterocyclic alkyl group.

15. The electrode of claim 14, wherein an amount of the polymer is from about 1 part to about 30 parts by weight based on 100 parts by weight of the electrode active material.

16. A lithium battery comprising the electrode of claim 14.

17. A polymer binder for lithium battery, which is a reaction product of
   (i) an alkali metal- or ammonium group-containing base and
   (ii) a polymer A comprising a first repeating unit represented by Formula 4c or Formula 4d, and a second repeating unit selected from a divalent aliphatic organic group repeating unit and a divalent alicyclic organic group repeating unit:

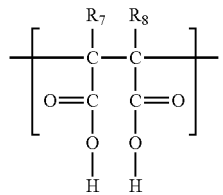

Formula 4c wherein, in Formula 4c, $R_7$ and $R_8$ are each independently a hydrogen atom or a C1-C10 alkyl group;

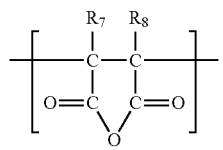

Formula 4d wherein, in Formula 4d,
$R_7$ and $R_8$ are each independently a hydrogen atom or a C1-C10 alkyl group; and
a mole fraction of the first repeating unit is from about 0.01 to about 0.99,
and a mole fraction of the second repeating unit is from about 0.01 to about 0.99.

18. The polymer binder of claim 17, wherein the second repeating unit is represented by Formula 5:

Formula 5 wherein, in Formula 5, $R_9$ to $R_{12}$ are each independently a hydrogen atom or a C1-C10 alkyl group; and
the polymer has a degree of polymerization of from about 100 to about 50,000.

19. The polymer binder of claim 17, wherein the alkali metal-containing base is at least one selected from lithium hydroxide, sodium hydroxide, potassium hydroxide, and ammonium hydroxide.

20. The polymer binder of claim 17, wherein the reaction product is a reaction product of a mixture at a temperature of from about 20° C. to about 100° C., the mixture comprising the polymer comprising the first repeating unit represented by Formula 4c or Formula 4d and the second repeating unit selected from a divalent aliphatic organic group repeating unit and a divalent alicyclic organic group repeating unit, the alkali metal- or ammonium group-containing base, and water.

* * * * *